US011940522B2

(12) United States Patent
Ishikawa

(10) Patent No.: US 11,940,522 B2
(45) Date of Patent: Mar. 26, 2024

(54) RADAR APPARATUS AND ANTENNA APPARATUS

(71) Applicant: DENSO CORPORATION, Kariya (JP)

(72) Inventor: Hiroki Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 17/664,553

(22) Filed: May 23, 2022

(65) Prior Publication Data

US 2022/0283281 A1 Sep. 8, 2022

Related U.S. Application Data

(63) Continuation of application No. PCT/JP2020/043433, filed on Nov. 20, 2020.

(30) Foreign Application Priority Data

Nov. 25, 2019 (JP) ................................ 2019-212456

(51) Int. Cl.
*G01S 13/26* (2006.01)
*G01S 7/02* (2006.01)
*G01S 13/48* (2006.01)
*G01S 13/931* (2020.01)
*H01Q 21/06* (2006.01)

(52) U.S. Cl.
CPC ................ *G01S 13/26* (2013.01); *G01S 7/02* (2013.01); *G01S 13/48* (2013.01); *G01S 13/931* (2013.01); *H01Q 21/06* (2013.01)

(58) Field of Classification Search
CPC ............................... H01Q 1/3233; H01Q 3/30
See application file for complete search history.

(56) References Cited

U.S. PATENT DOCUMENTS 4,595,924 A * 6/1986 Gehman ............... G01S 13/003 342/28
5,523,764 A * 6/1996 Martinez ............. H01Q 3/2605 342/372

(Continued)

FOREIGN PATENT DOCUMENTS

JP 2018136232 A 8/2018

*Primary Examiner* — Lam T Mai
(74) *Attorney, Agent, or Firm* — MASCHOFF BRENNAN

(57) ABSTRACT

A radar apparatus includes a transmission-reception antenna unit including a plurality of transmission antennas and a plurality of reception antennas along a predetermined array direction, which form a virtual array in which a plurality of virtual reception antennas are arranged along the array direction. Based on virtual reception signals received by the virtual reception antennas, the radar apparatus detects an object that reflects transmission signals, calculates a transmission phase difference between the transmission antennas of the transmission signals transmitted by the transmission antennas, and calculates a reception phase difference between the reception antennas of reception signals received by the reception antennas. The radar apparatus calculates a transmission-reception phase difference that is a difference between the calculated transmission phase difference and the calculated reception phase difference, and determines that the detected object is a ghost, in response to the calculated transmission-reception phase difference being greater than a predetermined phase threshold.

16 Claims, 20 Drawing Sheets

TRANSMISSION ANTENNA UNIT 3; RECEPTION ANTENNA UNIT 4; TRANSMITTING UNIT 2; MODULATOR 22; OSCILLATOR 21; RECEIVING UNIT 5; PROCESSING UNIT 6; CPU 61; MEMORY 62; M; N; L; 1

OBJECT DETECTION PROCESS
S10 SET REPETITION CYCLE
S20 SET NUMBER OF PHASES
S30 SELECT PHASE ROTATION AMOUNTS
S40 SET CORRESPONDING RELATIONSHIP
S50 IS MEASUREMENT START TIMING REACHED ? (NO / YES)
S60 PERFORM RADAR MEASUREMENT
S70 CALCULATE DISTANCE SPECTRUM
S80 CALCULATE VELOCITY SPECTRUM
S90 PERFORM INFORMATION GENERATION PROCESS
END

(56) References Cited

U.S. PATENT DOCUMENTS

| | | | | | |
|---|---|---|---|---|---|
| 5,585,803 | A * | 12/1996 | Miura | H01Q 3/26 | 342/372 |
| 6,996,077 | B1 * | 2/2006 | Suenaga | H04B 7/18526 | 370/320 |
| 2008/0143584 | A1 * | 6/2008 | Shoarinejad | G01S 13/751 | 342/127 |
| 2019/0394073 | A1 * | 12/2019 | Sano | H04L 27/22 | |
| 2020/0355789 | A1 * | 11/2020 | Kitamura | H01Q 21/08 | |
| 2020/0388917 | A1 * | 12/2020 | Fujibayashi | H04B 17/12 | |
| 2022/0413132 | A1 * | 12/2022 | Hasegawa | H01Q 1/3208 | |

* cited by examiner

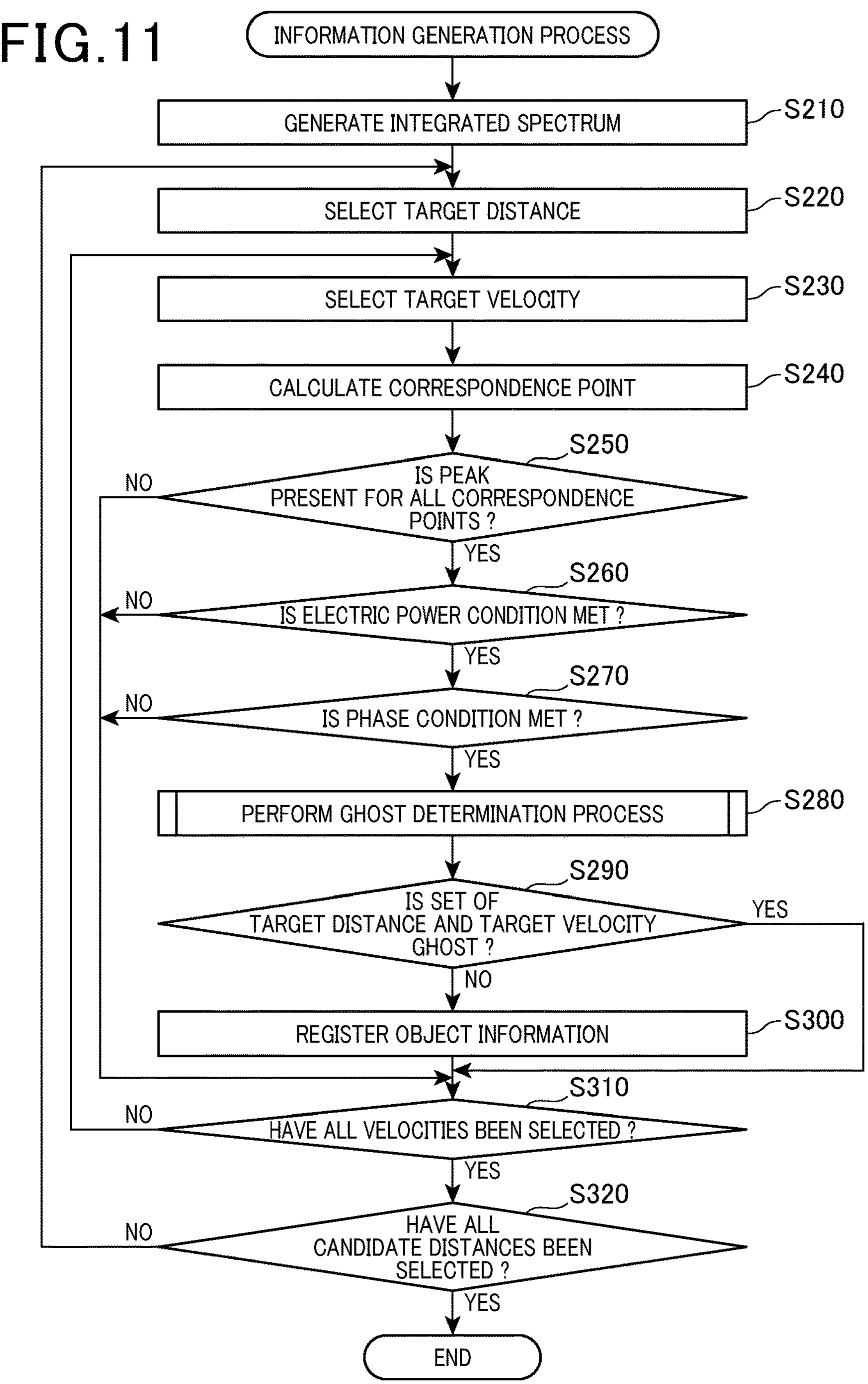
FIG.11
INFORMATION GENERATION PROCESS
GENERATE INTEGRATED SPECTRUM
S210
SELECT TARGET DISTANCE
S220
SELECT TARGET VELOCITY
S230
CALCULATE CORRESPONDENCE POINT
S240
S250
IS PEAK PRESENT FOR ALL CORRESPONDENCE POINTS ?
NO
YES
S260
IS ELECTRIC POWER CONDITION MET ?
NO
YES
S270
IS PHASE CONDITION MET ?
NO
YES
PERFORM GHOST DETERMINATION PROCESS
S280
S290
IS SET OF TARGET DISTANCE AND TARGET VELOCITY GHOST ?
YES
NO
REGISTER OBJECT INFORMATION
S300
S310
HAVE ALL VELOCITIES BEEN SELECTED ?
NO
YES
S320
HAVE ALL CANDIDATE DISTANCES BEEN SELECTED ?
NO
YES
END FIG.14
TRANSMISSION PHASE DIFFERENCE
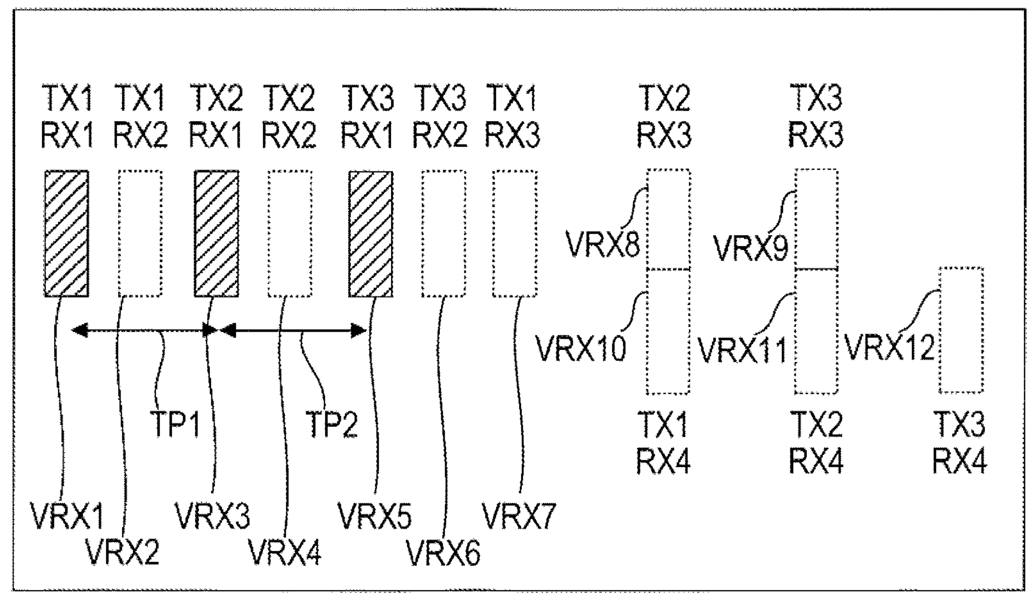
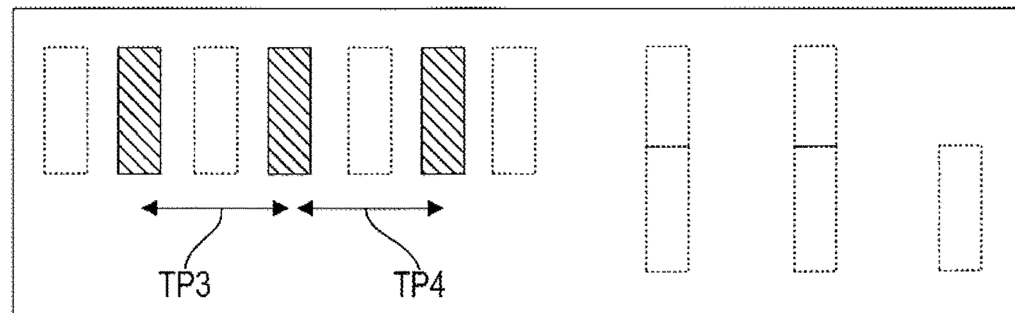
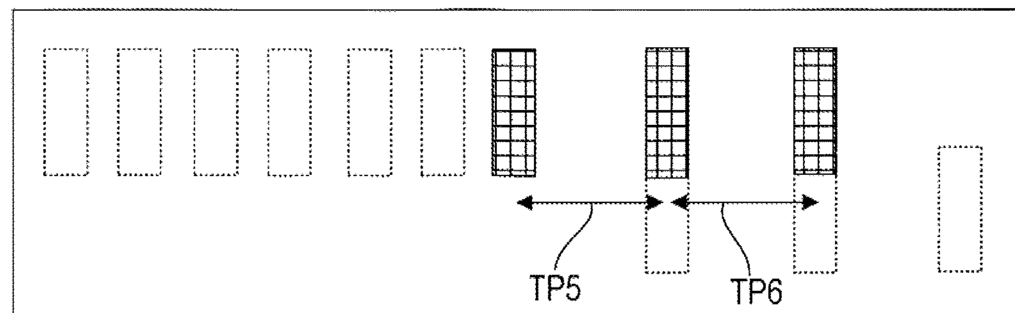
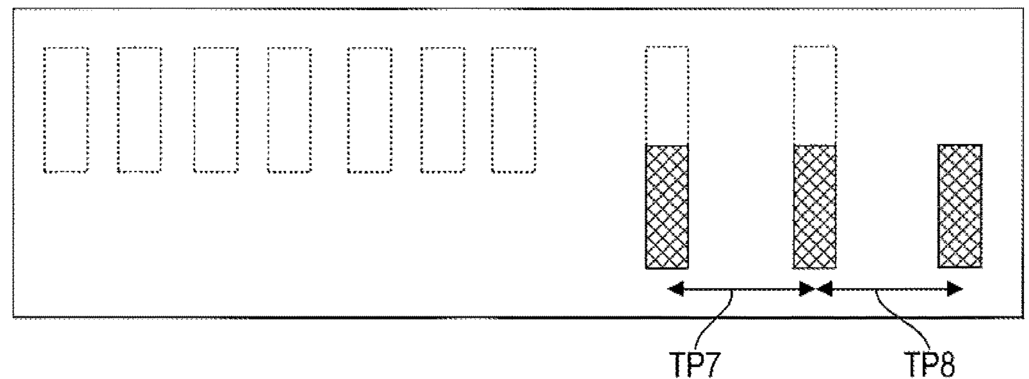

FIG.15
RECEPTION PHASE DIFFERENCE
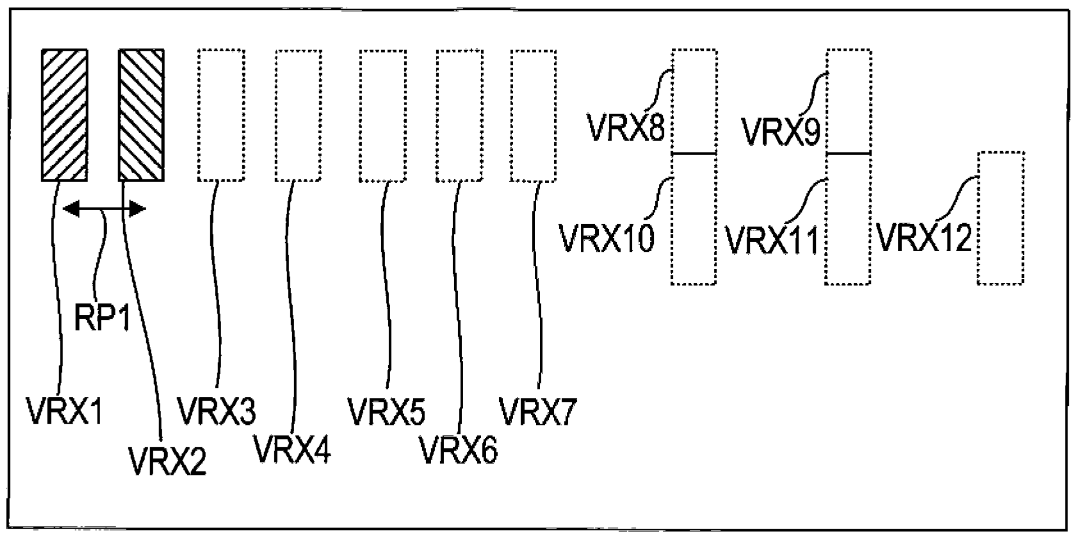
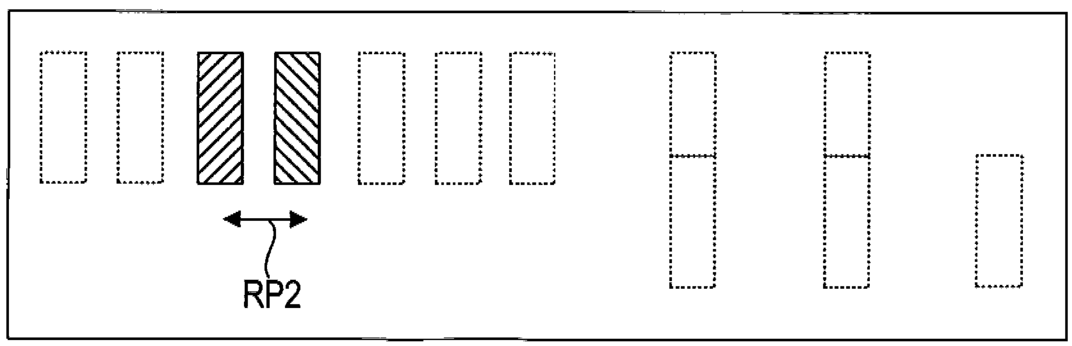
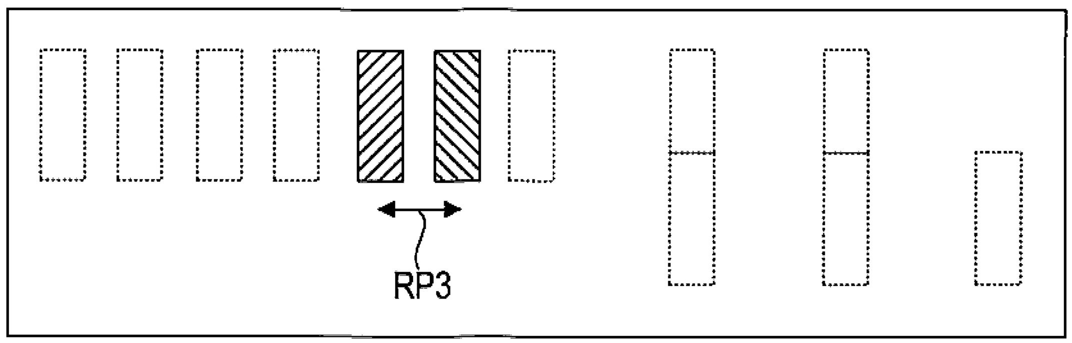

DC1
DC2
VH1
GR2
PG1
PG2
PG3
X[m]
Y[m]
20
0
-20
-40
-60
-80
-100
-10
-5
5
10

RADAR APPARATUS AND ANTENNA APPARATUS

CROSS-REFERENCE TO RELATED APPLICATION

The present application is a continuation application of International Application No. PCT/JP2020/043433, filed on Nov. 20, 2020, which claims priority to Japanese Patent Application No. 2019-212456, filed on Nov. 25, 2019. The contents of these applications are incorporated herein by reference in their entirety.

BACKGROUND

Technical Field

The present disclosure relates to a radar apparatus and an antenna apparatus.

Related Art

A radar apparatus that detects a target by forming a virtual array with a plurality of transmission antennas and a plurality of reception antennas is known. The radar apparatus detects a target under a precondition that a path by which a radar wave that is transmitted from the transmission antenna reaches the target (hereafter, a forward path) and a path by which a radar wave that is reflected by the target reaches the radar apparatus (hereafter, a return path) match.

SUMMARY

One aspect of the present disclosure provides a radar apparatus. The radar apparatus includes a transmission-reception antenna unit that includes a plurality of transmission antennas and a plurality of reception antennas along a predetermined array direction, which form a virtual array in which a plurality of virtual reception antennas are arranged along the array direction. Based on virtual reception signals received by the virtual reception antennas, the radar apparatus detects an object that reflects transmission signals, calculates a transmission phase difference between the transmission antennas of the transmission signals transmitted by the transmission antennas, and calculates a reception phase difference between the reception antennas of reception signals received by the reception antennas. The radar apparatus calculates a transmission-reception phase difference that is a difference between the calculated transmission phase difference and the calculated reception phase difference. The radar apparatus determines that the detected object is a ghost, in response to the calculated transmission-reception phase difference being greater than a predetermined phase threshold.

BRIEF DESCRIPTION OF THE DRAWINGS

In the accompanying drawings:

FIG. 11 is a flowchart illustrating an information generation process;

FIG. 14 is a diagram illustrating a transmission phase difference;

FIG. 15 is a diagram illustrating a reception phase difference;

DESCRIPTION OF THE EMBODIMENTS

Figure 1:
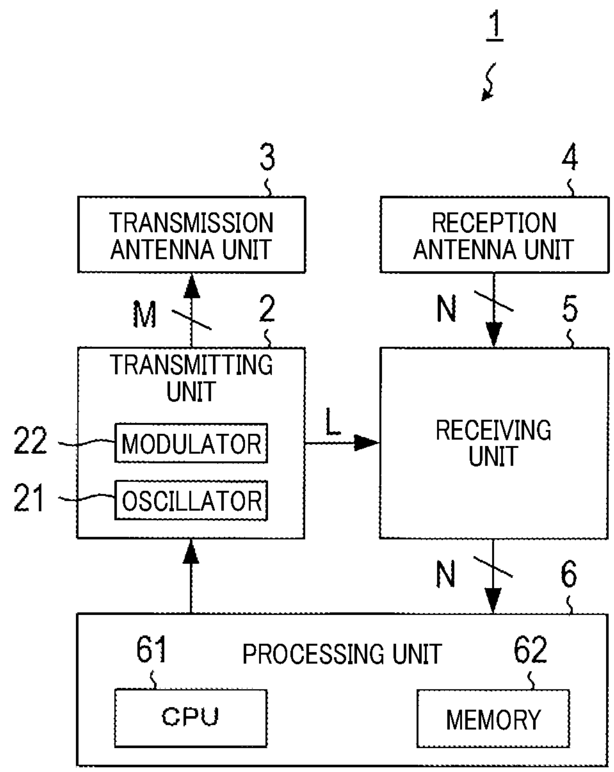
FIG. 1 is a block diagram illustrating a configuration of a radar apparatus.

The present disclosure relates to a radar apparatus that detects an object by transmitting and receiving radio waves through a plurality of antennas.

JP-A-2018-136232 describes a radar apparatus that detects a target by forming a virtual array with a plurality of transmission antennas and a plurality of reception antennas. The radar apparatus detects a target under a precondition that a path by which a radar wave that is transmitted from the transmission antenna reaches the target (hereafter, a forward path) and a path by which a radar wave that is reflected by the target reaches the radar apparatus (hereafter, a return path) match.

However, for example, when a radar wave that is transmitted from the radar apparatus that is mounted in a vehicle reaches the target after being reflected by a guardrail, the forward path and the return path do not match. As a result of detailed review by the inventors, an issue has been found in that, when the forward path and the return path do not match in this manner, for example, an object is detected regardless of the object not actually being present.

The present disclosure improves object detection accuracy.

A first exemplary embodiment of the present disclosure provides a radar apparatus that includes a transmission-reception antenna unit, an object detecting unit, a transmission phase difference calculating unit, a reception phase difference calculating unit, a transmission-reception phase difference calculating unit, and a phase ghost determining unit.

The transmission-reception antenna unit includes a plurality of transmission antennas along a predetermined array direction and a plurality of reception antennas along the array direction. The plurality of transmission antennas and the plurality of reception antennas form a virtual array in which a plurality of virtual reception antennas are arranged along the array direction.

The object detecting unit is configured to detect an object that reflects transmission signals that are transmitted from the plurality of transmission antennas, based on a plurality of virtual reception signals that are received by the plurality of virtual reception antennas.

The transmission phase difference calculating unit is configured to calculate a transmission phase difference between the plurality of transmission antennas of the transmission signals that are transmitted from the plurality of transmission antennas, based on the plurality of virtual reception signals.

The reception phase difference calculating unit is configured to calculate a reception phase difference between the plurality of reception antennas of reception signals that are received by the plurality of reception antennas, based on the plurality of virtual reception signals.

The transmission-reception phase difference calculating unit is configured to calculate a transmission-reception phase difference that is a difference between the transmission phase difference that is calculated by the transmission phase difference calculating unit and the reception phase difference that is calculated by the reception phase difference calculating unit.

The phase ghost determining unit is configured to determine that the object that is detected by the object detecting unit is a ghost, in response to the transmission-reception phase difference that is calculated by the transmission-reception phase difference calculating unit being greater than a predetermined phase threshold.

The radar apparatus of the exemplary embodiment that is configured in this manner can determine whether an object that is detected by the objecting unit is a ghost. Therefore, object detection accuracy can be improved.

A second exemplary embodiment aspect of the present disclosure provides a radar apparatus that includes a transmission-reception antenna unit, an object detecting unit, an orientation power calculating unit, a residual power calculating unit, and a power ghost determining unit.

The orientation power calculating unit is configured to calculate orientation power that is electric power of a signal that is received from an orientation of the object that is detected by the object detecting unit, among the plurality of virtual reception signals.

The residual power calculating unit is configured to calculate residual power that is electric power of a signal other than the signal that is received from the orientation, among the plurality of virtual reception signals.

The power ghost determining unit is configured to determine that the object that is detected by the object detecting unit is a ghost, in response to a power subtraction value being less than a predetermined power threshold, the power subtraction value being obtained by the residual power that is calculated by the residual power calculating unit being subtracted from the orientation power that is calculated by the orientation power calculating unit.

The radar apparatus of the present exemplary embodiment that is configured in this manner can determine whether an object that is detected by the objecting unit is a ghost. Therefore, object detection accuracy can be improved.

First Embodiment

A first embodiment of the present disclosure will hereinafter be described with reference to the drawings.

A radar apparatus 1 according to the present embodiment is mounted in a vehicle and detects various objects that are present in the vicinity of the vehicle. The radar apparatus 1 is a MIMO radar that simultaneously transmits and receives radio waves through a plurality of antennas. MIMO is an abbreviation of Multi Input Multi Output.

As shown in FIG. 1, the radar apparatus 1 includes a transmitting unit 2, a transmission antenna unit 3, a reception antenna unit 4, a receiving unit 5, and a processing unit 6.

The transmission antenna unit 3 includes M transmission antennas. M is an integer of 2 or greater. The transmission antennas are arranged in a row along a predetermined array direction. According to the present embodiment, the array direction is a width direction of the vehicle.

The reception antenna unit 4 includes N reception antennas. N is an integer of 2 or greater. The reception antennas are arranged along a direction that is the same as the array direction of the transmission antenna.

Figure 2:
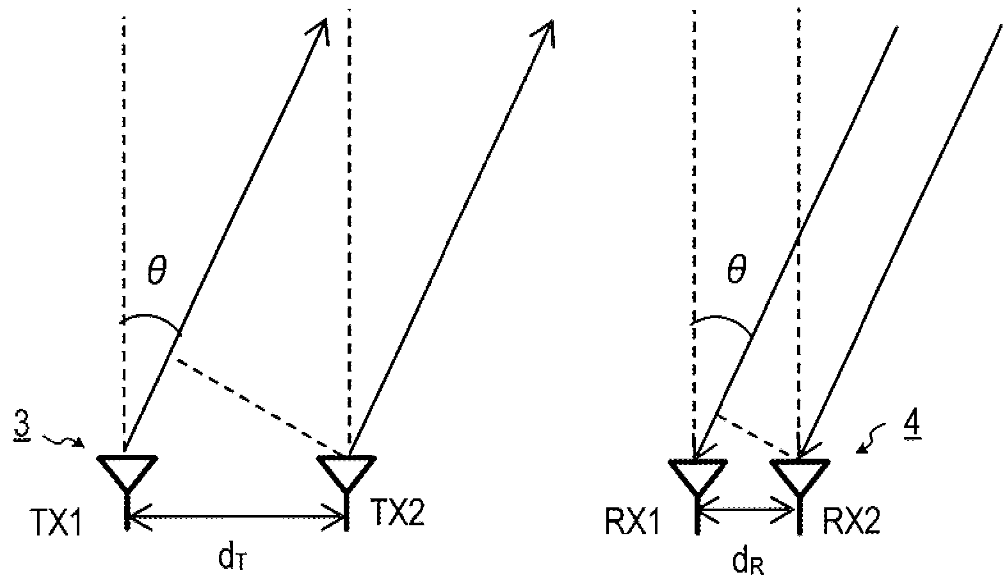
FIG. 2 is a diagram illustrating relationships between transmissions antennas and reception antennas, and an object.

Here, signals that are received by the reception antennas when M=2 and N=2 will be described. As shown in FIG. 2, an object that serves as a detection target is presumed to be present in a direction that is tilted at an angle θ relative to a front direction of the transmission antenna unit 3 and the reception antenna unit 4. In addition, an interval between a transmission antenna TX1 and a transmission antenna TX2 is an interval $d_T$. An interval between a reception antenna RX1 and a reception antenna RX2 is an interval $d_R$. Furthermore, a reflection coefficient at the object is denoted by D. A phase change of a signal on a path from the transmission antenna TX1 to the object is denoted by $\alpha_T$. A phase change of a signal on a path from the object to the reception antenna RX1 is denoted by ax. Here, $\alpha_T$ and $\alpha_R$ are expressed by complex numbers.

In this case, a signal that is transmitted from the transmission antenna TX1 and received by the reception antenna RX1 is expressed by expression (1). A signal that is transmitted from the transmission antenna TX1 and received by the reception antenna RX2 is expressed by expression (2). A signal that is transmitted from the transmission antenna TX2 and received by the reception antenna RX1 is expressed by expression (3). A signal that is transmitted from the transmission antenna TX2 and received by the reception antenna RX2 is expressed by expression (4).

$$\alpha_T \cdot D \cdot \alpha_R \tag{1}$$

$$\alpha_T \cdot D \cdot \alpha_R \cdot \exp(jkd_R \sin \theta) \tag{2}$$

$$\alpha_T \cdot D \cdot \alpha_R \cdot \exp(jkd_T \sin \theta) \tag{3}$$

$$\alpha_T \cdot D \cdot \alpha_R \cdot \exp(jk(d_T + d_R) \sin \theta) \tag{4}$$

Figure 3:
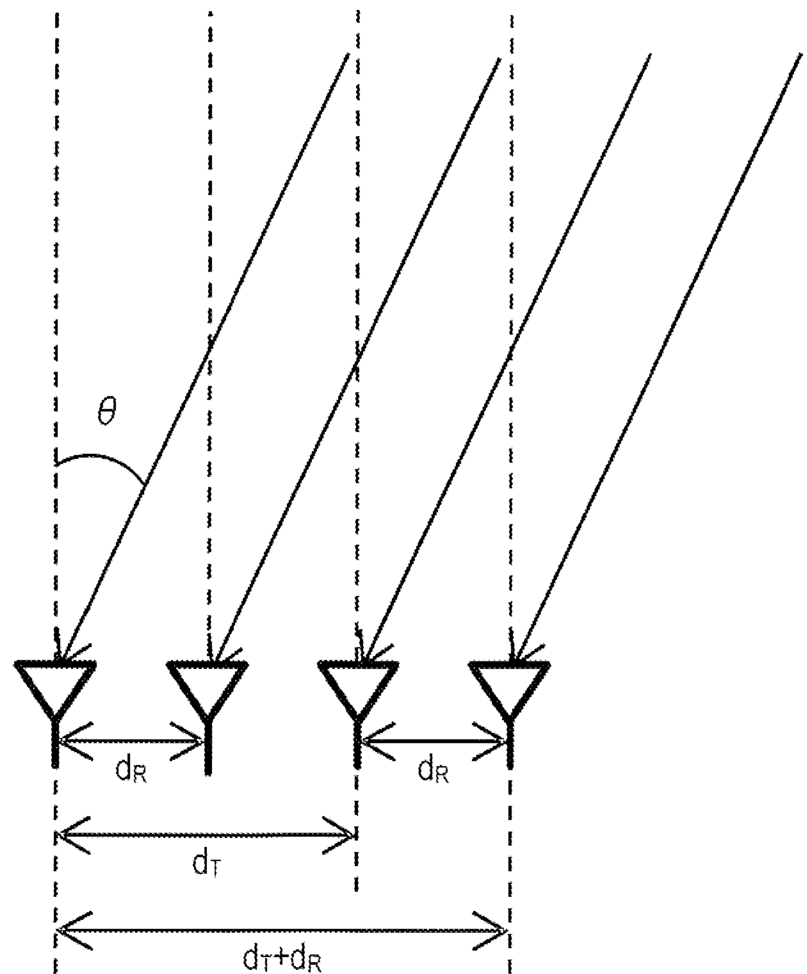
FIG. 3 is a diagram illustrating an arrangement of the reception antennas in a virtual array.

These expressions are equivalent to a case in which four reception antennas are arranged in positions in which distances from a reception antenna that serves as reference are respectively $d_R$, $d_T$, and $d_T+d_R$, as shown in FIG. 3. In FIG. 3, the reception antenna that is positioned furthest to the left serves as reference. Virtual reception antennas (referred to, hereafter, as virtual reception antennas) that are arranged in this manner are referred to as a virtual array.

In the MIMO radar, through use of the virtual array, an angular resolution that is equal to that when a single transmission antenna and (M×N) reception antennas are provided is actualized by (M+N) transmission antennas and reception antennas.

Figure 4:
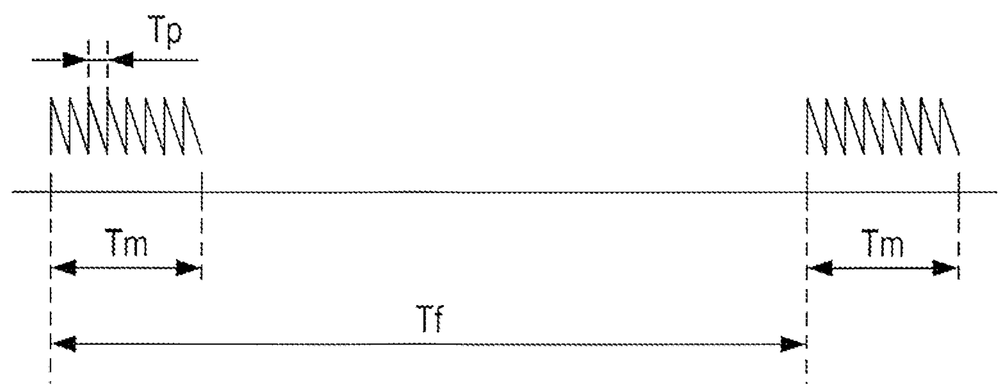
FIG. 4 is a diagram illustrating a repetition cycle of a chirp.

As shown in FIG. 1, the transmitting unit 2 includes an oscillator 21 and a modulator 22. The oscillator 21 generates a common signal that is a continuous wave. The oscillator 21 supplies the generated common signal to the modulator 22 and also supplies the generated common signal to the receiving unit 5 as a local signal L. In addition, as shown in FIG. 4, the oscillator 21 repeatedly generates, at a repetition cycle Tp (such as 50 μs), a chirp signal of which a frequency continuously changes, during a measurement period Tm (such as 10 ms) at a head of each frame, a single frame being a measurement cycle Tf (such as 50 ms).

The oscillator 21 is configured to be capable of changing the measurement cycle Tf, the measurement period Tm, and the repetition cycle Tp as appropriate, based on a command from the processing unit 6. Here, a frequency width of the chirp signal that is changed during the repetition cycle is fixed regardless of the repetition cycle Tp. That is, the configuration is such that a change rate Δf of the frequency of the chirp signal changes as a result of the repetition cycle Tp being changed.

In addition, an allowable range of the repetition cycle Tp and an allowable range of the change rate Δf of the frequency of the chirp signal are set such that a frequency deviation that occurs based on a relative velocity to an object is reduced to a negligible degree compared to a frequency deviation that occurs based on a distance to the object, when a beat signal that is generated by the transmission signal and the reception signal being mixed is analyzed.

The modulator 22 splits the common signal that is generated by the oscillator 21 and generates M split signals, the amount of which is the same as the number of transmission antennas belonging to the transmission antenna unit 3. The modulator 22 performs phase shift keying in which, for each of the M split signals, the phase of the split signal is changed at each repetition cycle Tp. As a result, M transmission signals that are respectively supplied to the transmission antennas are generated. In the phase shift keying, phase rotation amounts Δφ of differing magnitudes are respectively set for the M split signals. The phase of the split signal is rotated by the phase rotation amount Δφ at each repetition cycle.

Figure 5:
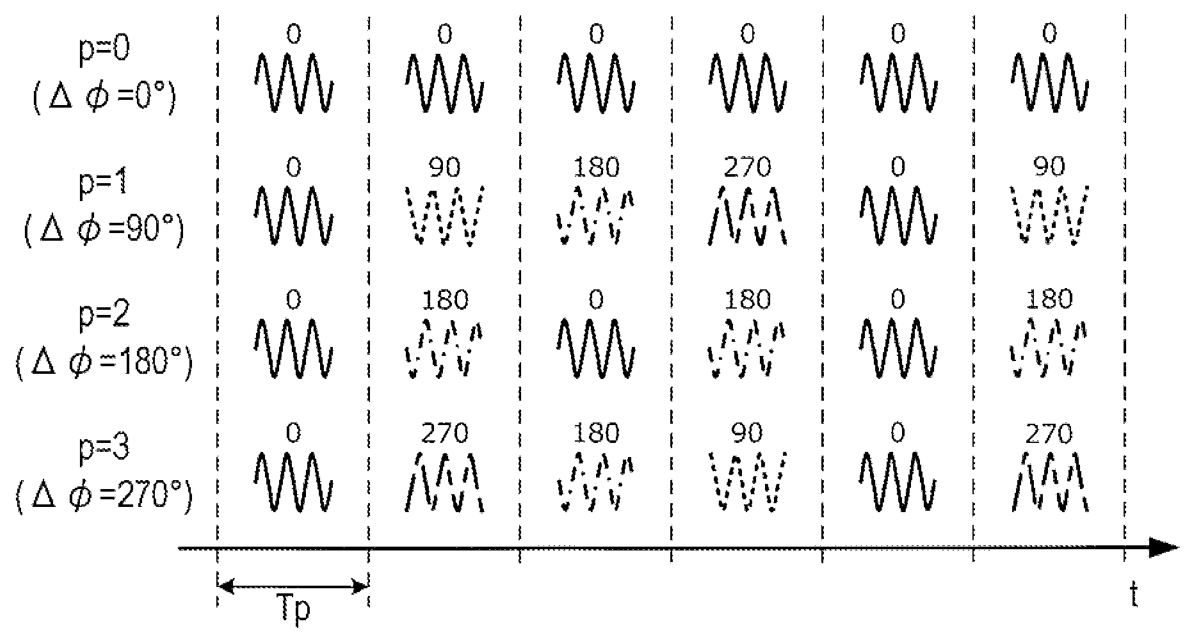
FIG. 5 is a diagram illustrating an example of phase rotation amounts that are used for phase shift keying in a modulator.

Here, the number of phases that are used in the phase shift keying is P. P is an integer that is greater than M. In the modulator 22, P types of phase rotation amounts expressed by $\Delta\varphi = p \times 360°/P$, where p=0, 1, 2, . . . , P−1, are used. For example, when P=4, as shown in FIG. 5, Δφ=0° when p=0. A phase difference of a transmission signal that is a signal after modulation relative to a split signal (that is, the common signal) that is a signal before modulation is 0° at all repetition cycles Tp. When p=1, Δφ=90°. The phase difference of the transmission signal relative to the common signal is switched at each repetition cycle Tp, changing in order of 0° 90° 180° 270° 0° (the same applies hereafter). When p=2, Δφ=180°. The phase difference of the transmission signal relative to the common signal is switched at each repetition cycle, changing in order of 0° 180° 0° 180° 0° (the same applies hereafter). When p=3, Δφ=270°. The phase difference of the transmission signal relative to the common signal is switched at each repetition cycle, changing in order of 0° 270° 180° 90° 0° (the same applies hereafter).

Because the setting is such that P>M as described above, in the phase shift keying, not all types of the P types of phase rotation amounts Δφ are used. A portion thereof is used.

The modulator 22 is configured to be capable of changing, as appropriate, the setting of the number of phases P, selection of M types of phase rotation amounts used for the phase shift keying among the P types of phase rotation amounts Δφ, and a setting regarding a corresponding relationship between the selected M types of phase rotation amounts and the M transmission antennas. The changes to the settings may be made based on a command from the processing unit 6. Alternatively, the changes to the settings may be automatically made. When the settings are automatically changed, the changes may be made based on a pattern that is determined in advance or at random.

As shown in FIG. 1, the receiving unit 5 generates the beat signal that is a difference signal with the local signal L, for each of the N reception signals outputted from the reception antennas belonging to the reception antenna unit 4, samples the generated beat signals, and supplies the sampled beat signals to the processing unit 6. A configuration for generating the beat signal from the reception signal in correspondence to each reception antenna (such as a mixer, an amplifier, and an analog-to-digital [AD] converter that are provided in correspondence to each reception antenna) is collectively referred to as a reception channel.

The processing unit 6 is an electronic control apparatus that is mainly configured by a known microcomputer that includes a central processing unit (CPU) 61, a memory 62, and the like. For example, the memory 62 may be a read-only memory (ROM) or a random access memory (RAM). Various functions of the microcomputer are actualized by the CPU 61 running a program that is stored in a non-transitory computer readable storage medium. In this example, the memory 62 corresponds to the non-transitory, tangible recording medium in which the program is stored. In addition, a method corresponding to the program is performed as a result of the program being run. Here, some or all of the functions provided by the CPU 61 may be configured by hardware, such as by one or a plurality of integrated circuits (ICs). In addition, the processing unit 6 may be configured by one or a plurality of microcomputers.

Next, steps in an object detection process that is performed by the processing unit 6 will be described. The object detection process is a process that is repeatedly performed after the processing unit 6 is started.

Figure 6:
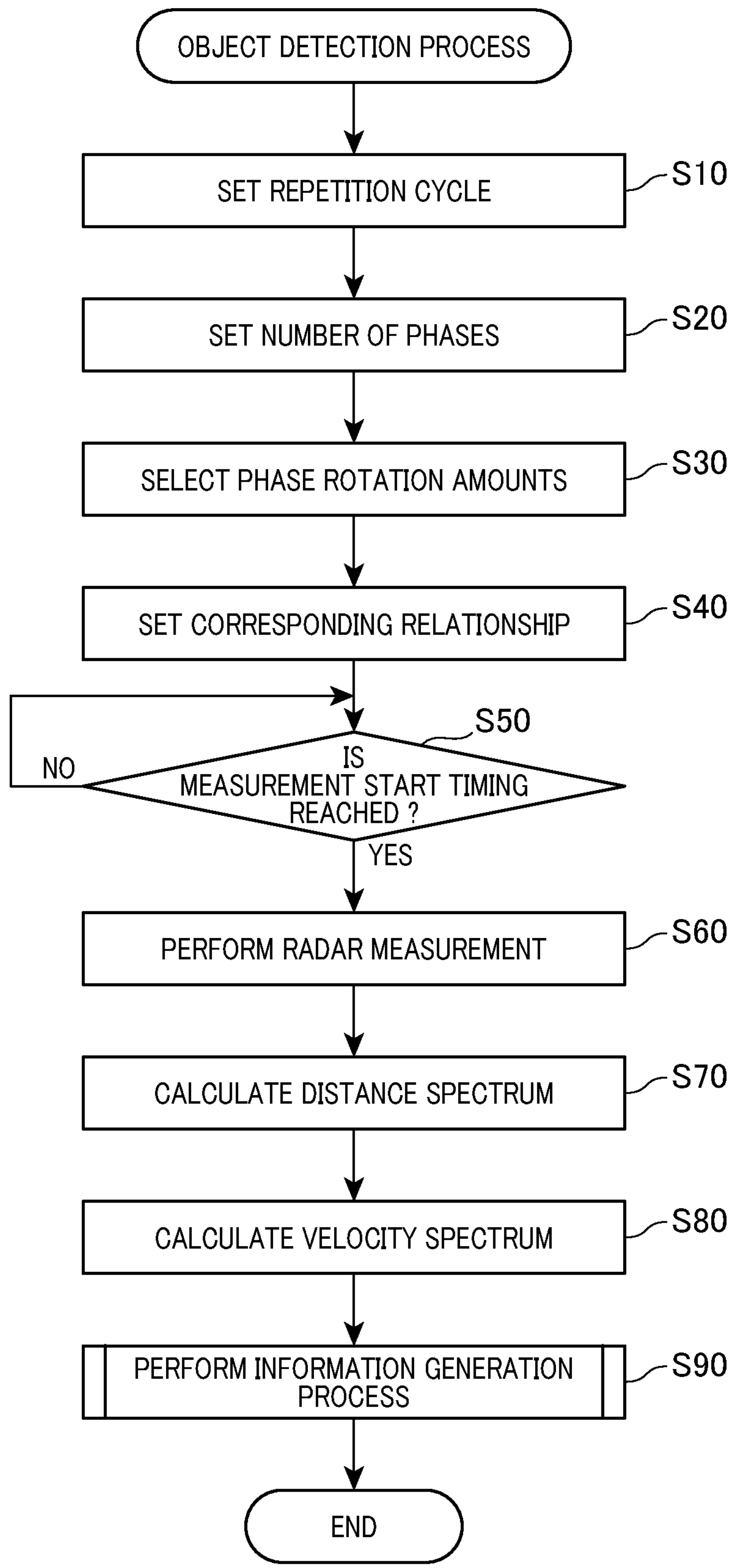
FIG. 6 is a flowchart illustrating an object detection process.

When the object detection process is performed, as shown in FIG. 6, first, at S10, the processing unit 6 sets the repetition cycle Tp that is a parameter related to the common signal that is generated in the oscillator 21. As described above, when the repetition cycle is changed, the change rate Δf of the frequency of the chirp signal changes. Here, the repetition cycle Tp may be a fixed value. Alternatively, the repetition cycle Tp may be set based on a pattern that is determined in advance each time the present process is performed, or by random selection from a plurality of types of values. In addition, at S110, the measurement cycle Tf and the measurement period Tm may be variably set as appropriate.

At S20, the processing unit 6 sets the number of phases P that is used for the phase shift keying in the modulator 22.

As the number of phases P, a value that is greater than the number of M transmission antennas is used. For example, P=M+1 may be set. Alternatively, the number of phases P may be a fixed value, or the number of phases P may be set based on a pattern that is determined in advance each time the present process is performed or by random selection from a plurality of types of values.

At S30, the processing unit 6 selects the M types of phase rotation amounts used for the phase shift keying in the modulator 22, among the P types of phase rotation amounts determined by the number of phases P. The M types of phase rotation amounts are selected such that the rotation amounts are not evenly arranged over 360°, that is, such that the rotation amounts are unevenly arranged.

Specifically, when P and M do not have a common divisor, the phase rotation amounts can be arbitrarily selected. When P and M have a common divisor, the selection is required to be made with care such that arrangement intervals are not repeats of the same pattern.

Figure 7:
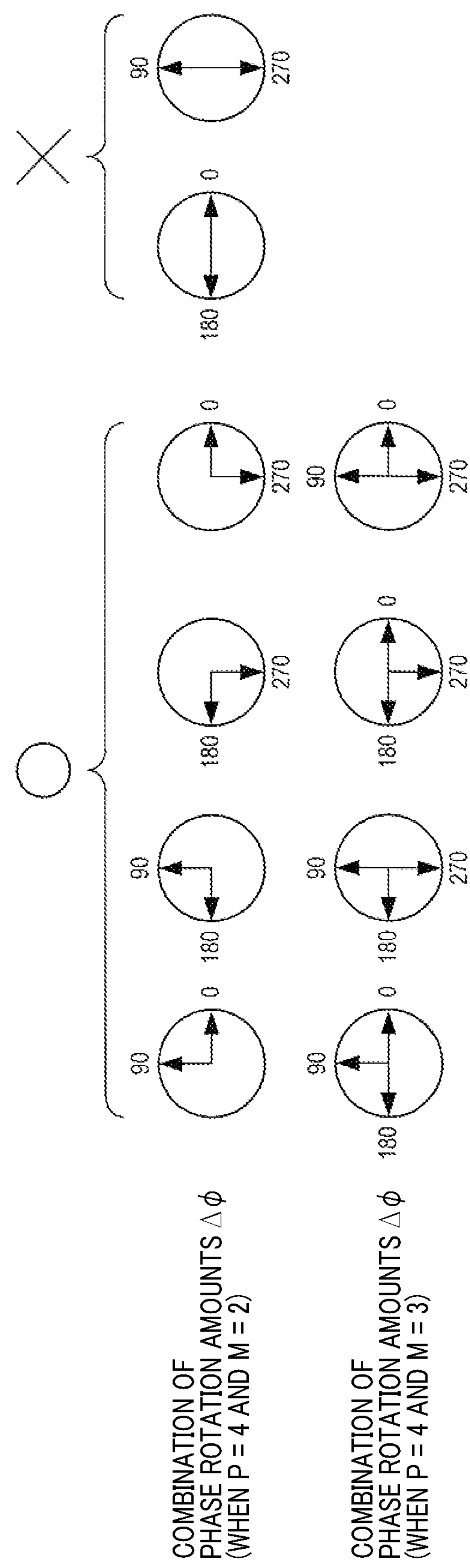
FIG. 7 is a diagram illustrating selectable and unselectable combination patterns of phase rotation amounts.

For example, as shown in FIG. 7, when P=4 and M=2, (0°,90°), (90°,180°), (180°, 270°), and (270°, 0°) can be selected as combinations of phase rotation amounts. However, (0°, 180°) and (90°, 270°) cannot be selected. In addition, when P=4 and M=3, (0°, 90°), 180°), (90°, 180°, 270°), (180°, 270°,0°), and (270°,0°,90°) can all be selected as combinations of phase rotation amounts. However, according to the present embodiment, a combination that includes $\Delta\varphi=0°$ is selected at all times.

Here, the selection of the phase rotation amounts may be fixed at all times. Alternatively, the selection of the phase rotation amounts may be switched based on a pattern that is determined in advance or at random, among the selectable combinations, each time the present process is performed.

Upon completion of the process at S30, as shown in FIG. 6, at S40, the processing unit 6 sets a corresponding relationship between the M types of phase rotation amounts selected at S30 and the transmission antennas. For example, this correspondence may be assigned based on a rule that is set in advance or assigned at random. In addition, the correspondence may be fixed at all times. Alternatively, the correspondence may be switched based on a pattern that is determined in advance or at random, each time the present process is performed.

Figure 8:
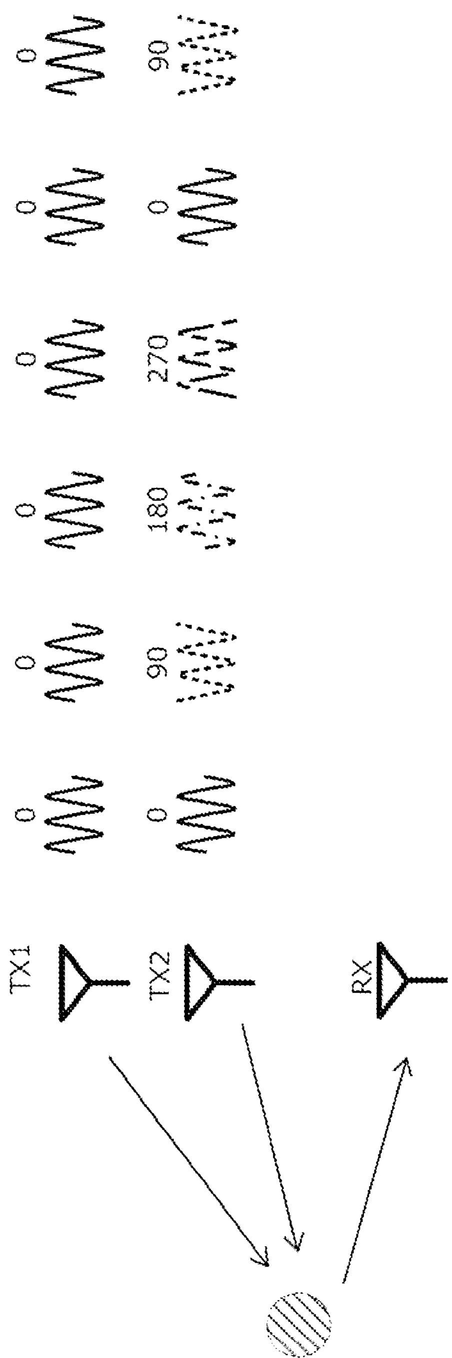
FIG. 8 is a diagram illustrating an example of selection of the phase rotation amounts.

FIG. 8 expresses an aspect in which the phases of the transmission signals that are respectively supplied to the transmission antennas TX1 and TX2 change, when P=4 and M=2, (0°, 90°) is selected as the combination of phase rotation amounts, and $\Delta\varphi=0°$ is assigned to the transmission antenna TX1 and $\Delta\varphi=90°$ is assigned to the transmission antenna TX2.

Upon completion of the process at S40, as shown in FIG. 6, at S50, the processing unit 6 determines whether a measurement start timing is reached. When determined that the measurement start timing is not reached, the processing unit 6 waits by repeating the process at S50 until the measurement start timing is reached. When determined that the measurement start timing is reached, the processing unit 6 proceeds to S60. The measurement start timing is a timing at which a frame of which a length is determined by the measurement period Tf is switched.

Upon proceeding to S60, the processing unit 6 operates the transmitting unit 2 based on the setting results at S10 to S40 and performs radar measurement. Specifically, the processing unit 6 makes the transmitting unit 2 repeatedly transmit the chirp signal at each repetition cycle Tp during the measurement period Tm, and acquires a sampling result of the beat signals that are generated from the reception signals thereof. Hereafter, the number of chirp signals that are repeatedly transmitted during the measurement period Tm is K.

At S70, the processing unit 6 calculates K distance spectrums for each of the N reception antennas by performing frequency analysis on the sampling results of the beat signals acquired from the N reception antennas, for each reception antenna and for each chirp signal. In the distance spectrum, a peak appears at a frequency based on an amount of time required to propagate to and from an object that reflects a radiation wave transmitted from the transmission antenna (that is, a distance to the object). A frequency bin of the distance spectrum is referred to as a distance bin.

At S80, the processing unit 6 calculates a velocity spectrum for each reception antenna using (N×K) distance spectrums calculated at S70. Specifically, the processing unit 6 extracts signals of the same frequency bin from the K distance spectrums related to a reception antenna of interest, and performs a frequency analysis process on the extracted signals in a time-axis direction. This process is performed on all frequency bins (that is, distances).

In the velocity spectrum, when a relative velocity to the object that reflects the radiation wave from the transmission antenna unit 3 is zero, a frequency that is based on the phase rotation amount assigned to each transmission antenna is extracted as a Doppler frequency. That is, a frequency of a signal component corresponding to $\Delta\varphi=0°$ is 0 Hz.

Figure 9:
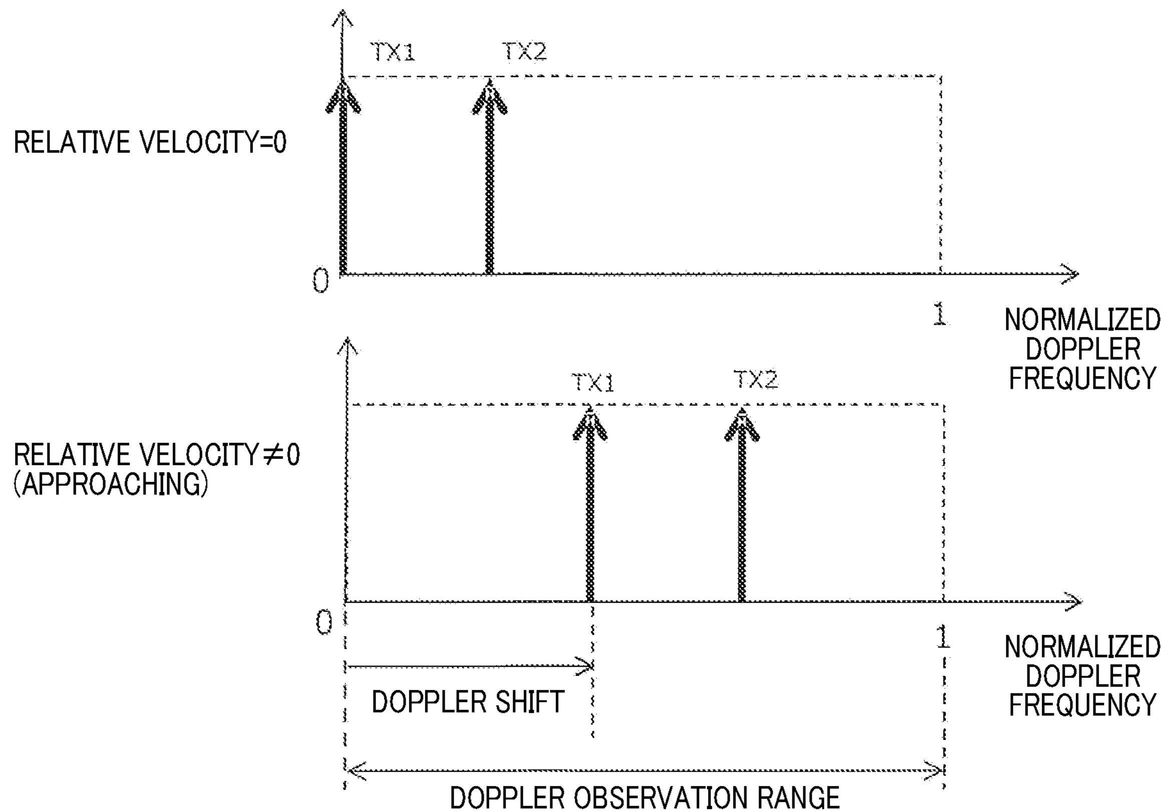
FIG. 9 is a diagram illustrating an example of the same-object peak group that appears on a velocity spectrum.

Here, a range over which the Doppler frequency is observed (hereafter, a Doppler observation range) is determined by the repetition cycle Tp. In addition, as shown in FIG. 9, the Doppler frequency is detected at M points among points dividing the Doppler observation range into P. In FIG. 9, an upper limit of the Doppler observation range is normalized at 1.

In addition, in the velocity spectrum, when a relative velocity to the object is present, the M Doppler frequencies shift by a magnitude based on the relative velocity, and folding of the frequency occurs based on a magnitude of the relative velocity.

Figure 10:
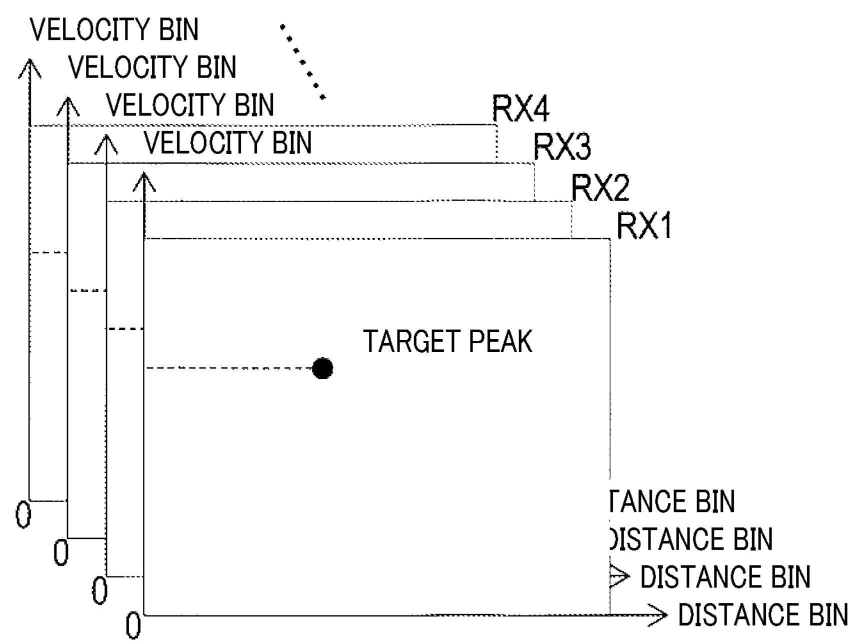
FIG. 10 is a diagram illustrating a reception spectrum.

Based on the calculation results at S70 and S80, as shown in FIG. 10, a two-dimensional spectrum (hereafter, a reception spectrum) that expresses a distance and a relative velocity to an object that reflects a radar wave is generated for each reception antenna.

As shown in FIG. 6, at S90, the processing unit 6 performs an information generation process in which the distance and the relative velocity to the object that reflects the radar wave, and an orientation at which the object is present are calculated using the reception spectrum for each reception antenna. The processing unit 6 ends the object detection process.

Next, steps in the information generation process performed at S90 will be described.

When the information generation process is performed, as shown in FIG. 11, first, at S210, the processing unit 6 performs incoherent integration of the N reception spectrums generated for the reception antennas at S80 and calculates a single integrated spectrum g(r, v). With the reception spectrum for each reception antenna expressed by s(r, v, Rch), the integrated spectrum g(r, v) is calculated using expression (5). r denotes distance, v denotes a normalized Doppler velocity of which a velocity corresponding to an upper limit frequency of the Doppler observation range is 1, and Rch is a number that identifies the reception antenna.

$$g(r,v)=\sum_{Rch=1}^{N}|s(r,v,Rch)|^2 \tag{5}$$

At S220, the processing unit 6 selects, as a target distance r, a distance that is not yet selected as a subject for processing at S230 to S300, below, among candidate distances. The candidate distances are distances at which M peaks or more that have a strength that is equal to or greater than a predetermined threshold are detected on the integrated spectrum.

At S230, the processing unit 6 selects, as a target velocity v, a velocity that corresponds to a peak that is not yet selected as a processing subject at S240 to S300, below, among a plurality of peaks that are detected at the target distance r selected at S220. Here, the processing unit 6 selects the velocity in order from lowest.

At S240, the processing unit 6 calculates (M−1) correspondence points (r, vj), where j=2 to M, at which a peak that corresponds to another phase rotation amount is estimated to be present, based on expression (6), under an assumption that the peak of the target velocity v is a peak that corresponds to the phase rotation amount $\Delta\varphi=0°$. x(j) is a phase rotation amount other than $\Delta\varphi=0°$ selected at S30. v and vj are normalized Doppler frequencies and are values from 0 to 1. mod(a, m) denotes a remainder after a is divided by m.

$$v_j=v+\mathrm{mod}(x(j)-x(1)/P,1) \tag{6}$$

At S250, the processing unit 6 determines whether a peak (that is, a secondary maximum point) is present on the integrated spectrum, regarding all correspondence points estimated at S240. When determined YES, the processing unit 6 proceeds to S260. When determined NO, the processing unit 6 proceeds to S310. Hereafter, the M peaks corresponding to the correspondence points are referred to as a candidate peak group.

Upon proceeding to S260, the processing unit 6 determines whether the candidate peak group meets an electric power condition. When determined YES, the processing unit 6 proceeds to S270. When determined NO, the processing unit 6 proceeds to S300. Here, as the electric power condition, a signal strength difference between peaks belonging to the candidate peak group being within a predetermined allowable range is used. This is based on knowledge that signal strengths of peaks that are based on reflected waves from the same object should all be similar.

Upon proceeding to S270, the processing unit 6 determines whether the candidate peak group meets a phase condition. When determined YES, the processing unit 6 proceeds to S280. When determined NO, the processing unit 6 proceeds to S310. Here, as the phase condition, a reception-channel phase difference between a reference reception channel and a reception channel other than the reference reception channel being calculated and a difference in this phase difference between candidate peaks being within a predetermined allowable range is used. This is based on an inter-reception phase difference between peaks arriving from the same direction all being similar in magnitude, based on knowledge that peaks that are based on reflected waves from the same object should all arrive from the same direction. Hereafter, the candidate peak group that is determined YES at S270 is referred to as the same-object peak group.

Upon proceeding to S280, the processing unit 6 performs a ghost determination process described hereafter. Then, at S290, the processing unit 6 determines whether a set of the target distance r and the target velocity v is a ghost based on the determination result at S280. Here, when the set of the target distance r and the target velocity v is a ghost, the processing unit 6 proceeds to S310.

Meanwhile, when the set of the target distance r and the target velocity v is not a ghost, at S300, the processing unit 6 registers a set of the target distance r, the target velocity v, and an orientation θ calculated at S410, described hereafter, as object information.

Then, at S310, the processing unit 6 determines whether all of the peaks (that is, velocities) detected at the target distance r have been selected as the target velocity v. When determined YES, the processing unit 6 proceeds to S320. When determined NO, the processing unit 6 proceeds to S230.

Upon proceeding to S320, the processing unit 6 determines whether all of the candidate distances have been selected as the target distance r. When determined YES, the processing unit 6 ends the information generation process. When determined NO, the processing unit 6 proceeds to S220.

Next, steps in the ghost determination process performed at S280 will be described.

Figure 12:
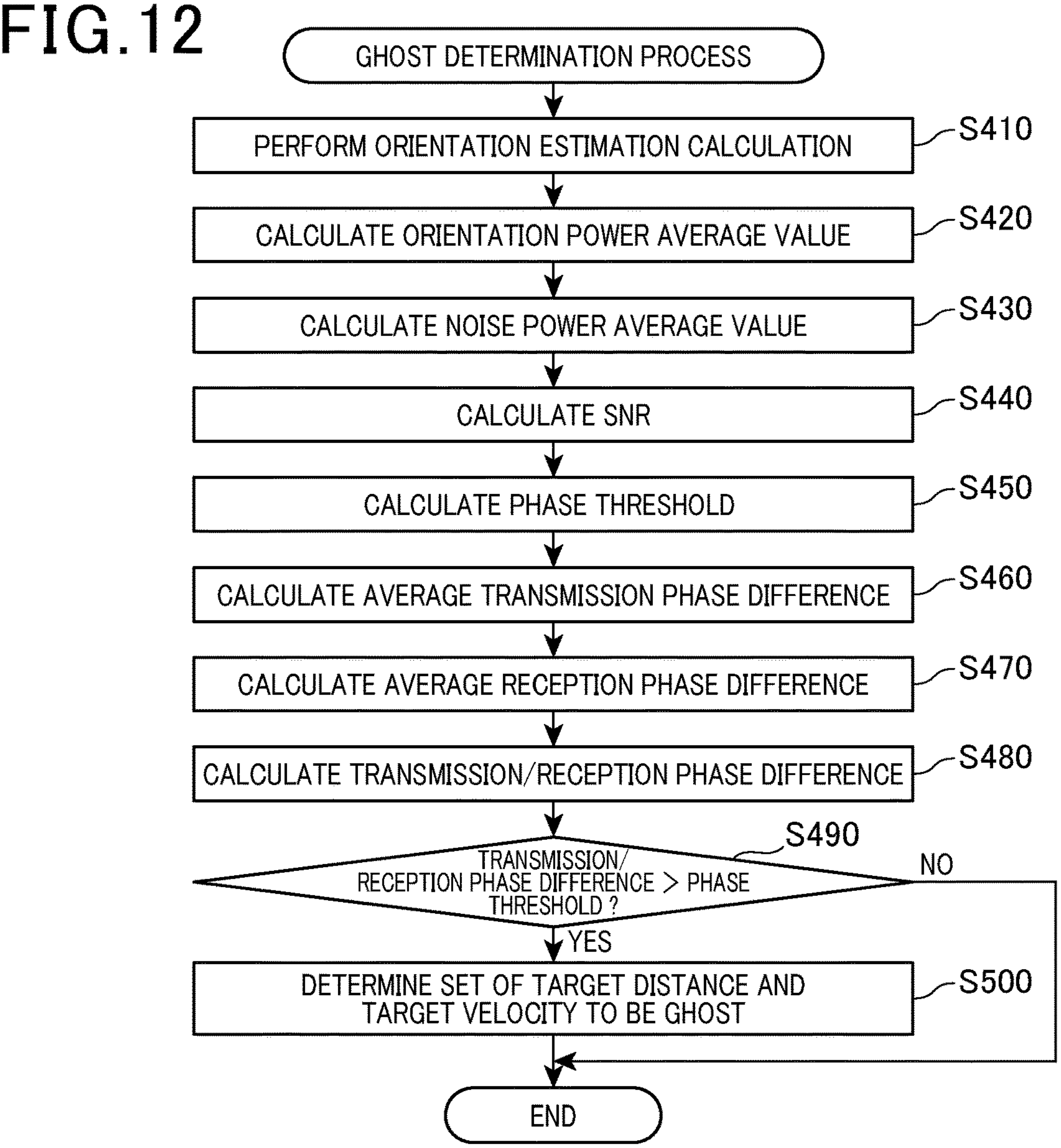
FIG. 12 is a flowchart illustrating a ghost determination process according to a first embodiment.

When the ghost determination process is performed, as shown in FIG. 12, first, at S410, the processing unit 6 performs an orientation estimation calculation and calculates the orientation θ at which the object is present. Specifically, the processing unit 6 extracts peaks that correspond to the M same-object peak groups from each of the N reception spectrums calculated for the reception antennas. The extracted (M×N) peaks are considered to be reception signals from the (M×N) reception antennas that are included in the virtual array. As a result of an orientation detection process, such as MUSIC or beam forming, being performed, the orientation θ of the object is calculated. MUSIC is an abbreviation for MUltiple SIgnal Classification. Here, the M peaks that are extracted as the same-object peak group from each reception signal of the N reception antennas correspond to the (M×N) reception signals (hereafter, virtual reception signals) that are acquired from the virtual array.

At S420, the processing unit 6 calculates an orientation power average value. Specifically, first, the processing unit 6 calculates electric power (hereafter, orientation power) of the virtual reception signal from the orientation θ calculated at S410 for each of the (M×N) virtual reception antennas. Then, the processing unit 6 sets an average value of the calculated (M×N) orientation powers as the orientation power average value.

Next, at S430, the processing unit 6 calculates a noise power average value. Specifically, first, the processing unit 6 calculates, as a noise floor, an average value of electric power in a region that is not the peak (that is, a noise region) for each of the N reception spectrums generated for the reception antennas at S80. Then, the processing unit 6 sets the average value of the noise floor of the N reception spectrums as the noise power average value.

Furthermore, at S440, the processing unit 6 calculates a signal-to-noise ratio (hereafter, SNR). Specifically, the processing unit sets a subtraction value that is obtained by subtracting the noise power average value calculated at S430 from the orientation power average value calculated at S420 as the SNR.

Figure 13:
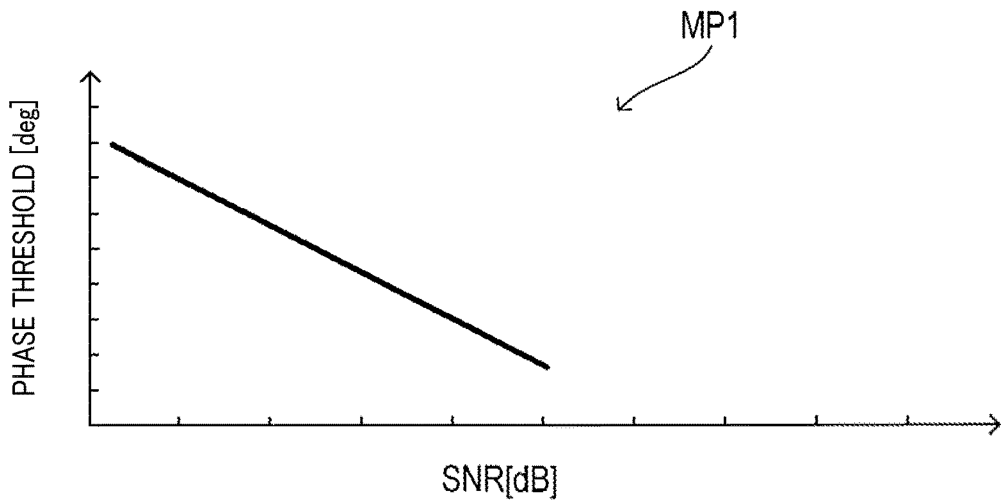
FIG. 13 is a diagram illustrating a configuration of a phase threshold map.

Then, at S450, the processing unit 6 calculates a phase threshold. Specifically, the processing unit 6 calculates the phase threshold from the SNR calculated at S440 by referencing a phase threshold map MP1 that indicates a corresponding relationship between the SNR and the phase threshold. As shown in FIG. 13, the phase threshold map MP1 is set such that a negative correlation is present between the SNR and the phase threshold. Here, "a negative correlation is present between the SNR and the phase threshold" includes the phase threshold continuously decreasing in accompaniment with increase in the SNR, in addition to the phase threshold decreasing in steps in accompaniment with increase in the SNR.

Upon completion of the process at S450 as shown in FIG. 12, at S460, the processing unit calculates an average transmission phase difference. Specifically, for example, as shown in FIG. 14, the processing unit 6 may calculate eight transmission phase differences TP1, TP2, TP3, TP4, TP5, TP6, TP7, and TP8, and may calculate an average value thereof as the average transmission phase difference.

The transmission phase difference TP1 is a difference between a phase of a signal that is received by a virtual reception antenna VRX1 and a phase of a signal that is received by a virtual reception antenna VRX3.

The transmission phase difference TP2 is a difference between a phase of a signal that is received by the virtual reception antenna VRX3 and a phase of a signal that is received by a virtual reception antenna VRX5.

The transmission phase difference TP3 is a difference between a phase of a signal that is received by a virtual reception antenna VRX2 and a phase of a signal that is received by a virtual reception antenna VRX4.

The transmission phase difference TP4 is a difference between a phase of a signal that is received by the virtual reception antenna VRX4 and a phase of a signal that is received by a virtual reception antenna VRX6.

The transmission phase difference TP5 is a difference between a phase of a signal that is received by a virtual reception antenna VRX7 and a phase of a signal that is received by a virtual reception antenna VRX8.

The transmission phase difference TP6 is a difference between a phase of a signal that is received by the virtual reception antenna VRX8 and a phase of a signal that is received by a virtual reception antenna VRX9.

The transmission phase difference TP7 is a difference between a phase of a signal that is received by a virtual reception antenna VRX10 and a phase of a signal that is received by a virtual reception antenna VRX11.

The transmission phase difference TP8 is a difference between a phase of a signal that is received by the virtual reception antenna VRX11 and a phase of a signal that is received by a virtual reception antenna VRX12.

The virtual reception antennas VRX1 and VRX2 are respectively virtual reception antennas formed by the transmission antenna TX1 and the reception antennas RX1 and RX2.

The virtual reception antennas VRX3 and VRX4 are respectively virtual reception antennas formed by the transmission antenna TX2 and the reception antennas RX1 and RX2.

The virtual reception antennas VRX5 and VRX6 are respectively virtual reception antennas formed by a transmission antenna TX3 and the reception antennas RX1 and RX2.

The virtual reception antennas VRX7, VRX8, and VRX9 are respectively virtual reception antennas formed by the transmission antennas TX1, TX2, and TX3 and a reception antennas RX3.

The virtual reception antennas VRX10, VRX11, and VRX12 are respectively virtual reception antennas formed by the transmission antennas TX1, TX2, and TX3 and a reception antennas RX4.

Here, as described above, the processing unit 6 calculates the transmission phase differences TP1 to TP8 taking into consideration ±1 time phase folding. Here, +1 time phase folding is when phases have a difference of 360°, such as +10° and +370°. That is, for example, the processing unit 6 may calculate the transmission phase differences TP1 to TP8 by taking into consideration when the phase is +10° and when the phase is +370°. In addition, −1 time phase folding is when phases have a difference of −360°, such as +10° and −350°. That is, for example, the processing unit 6 may calculate the transmission phase differences TP1 to TP8 by taking into consideration when the phase is +10° and when the phase is −350°.

Upon completion of the process at S460, as shown in FIG. 12, at S470, the processing unit 6 calculates an average reception phase difference. Specifically, for example, as shown in FIG. 15, the processing unit 6 may calculate three reception phase differences RP1, RP2, and RP3 and may calculate an average value thereof as the average reception phase difference.

The reception phase difference RP1 is a difference between a phase of a signal received by the virtual reception antenna VRX1 and a phase of a signal received by the virtual reception antenna VRX2.

The reception phase difference RP2 is a difference between a phase of a signal received by the virtual reception antenna VRX3 and a phase of a signal received by the virtual reception antenna VRX4.

The reception phase difference RP3 is a difference between a phase of a signal received by the virtual reception antenna VRX5 and a phase of a signal received by the virtual reception antenna VRX6.

Upon completion of the process at S470, as shown in FIG. 12, at S480, the processing unit 6 calculates a difference between the average transmission phase difference calculated at S460 and the average reception phase difference calculated at S470, and sets the difference as a transmission-reception phase difference.

Next, at S490, the processing unit 6 determines whether the transmission-reception phase difference calculated at S480 is greater than the phase threshold calculated at S450. Here, when the transmission-reception phase difference is equal to or less than the phase threshold, the processing unit 6 ends the ghost determination process. Meanwhile, when the transmission-reception phase difference is greater than the phase threshold, at S500, the processing unit 6 determines that the set of the target distance r and the target velocity v is a ghost and ends the ghost determination process.

Next, a reason whether the set of the target distance r and the target velocity v is a ghost can be determined based on the transmission-reception phase difference will be described.

Figure 16:
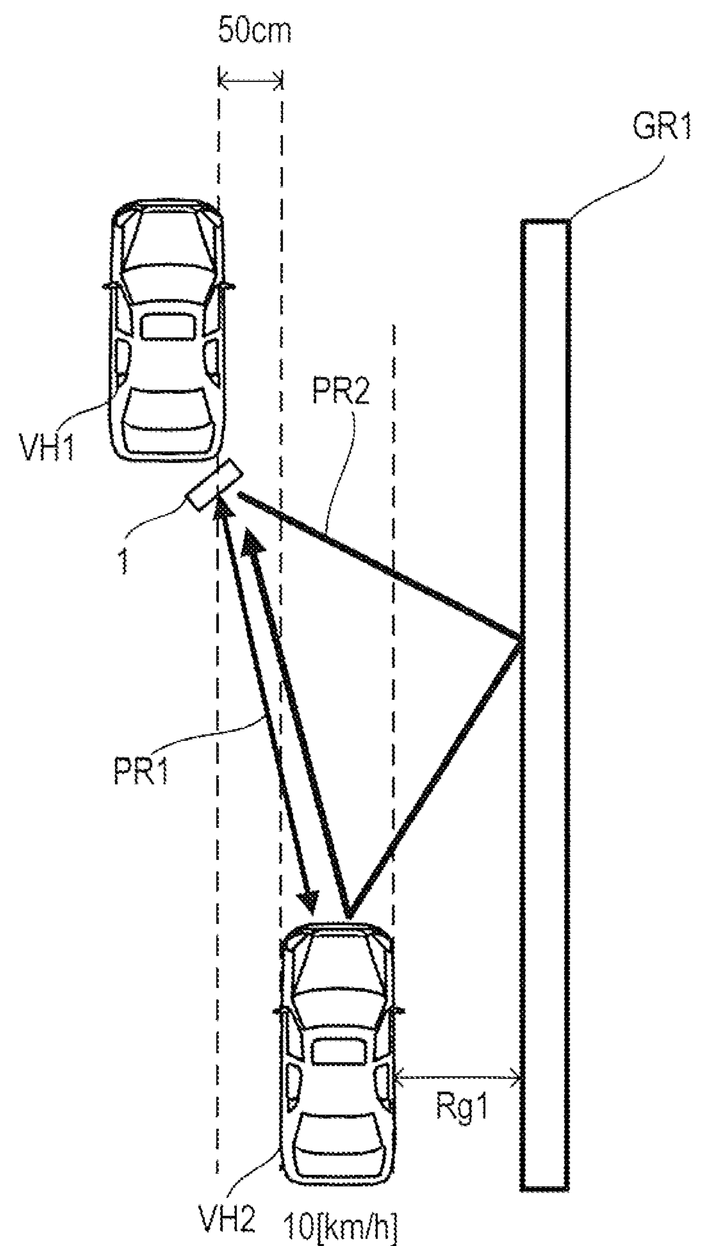
FIG. 16 is a diagram illustrating a state in which another vehicle is approaching from a rear right side of a vehicle.

As shown in FIG. 16, a vehicle VH2 that is present in an adjacent traffic lane on a right side of a vehicle VH1 in which the radar apparatus 1 is mounted approaches from a rear right side of the vehicle VH1. The radar apparatus 1 transmits a radar wave towards the rear right side of the vehicle VH1. In addition, a guardrail GR1 is present on the right side of the vehicle VH1 and the vehicle VH2.

In this case, as indicated by a straight line PR1 and a polygonal line PR2, as paths by which the radar wave that is transmitted from the radar apparatus 1 is reflected by the vehicle VH2 and received by the radar apparatus 1, a path in which the forward path and the return path match, and a path in which the forward path and the return path do not match are present.

The straight line PR1 is the path in which the forward path and the return path match. That is, in the path indicated by the straight line PR1, the radar wave that is transmitted from the radar apparatus 1 directly reaches the vehicle VH2. Meanwhile, the polygonal line PR2 is the path in which the forward path and the return path do not match. That is, in the path indicated by the polygonal line PR2, the radar wave that is transmitted from the radar apparatus 1 reaches the vehicle VH2 after being reflected by the guardrail GR1.

Figure 17:
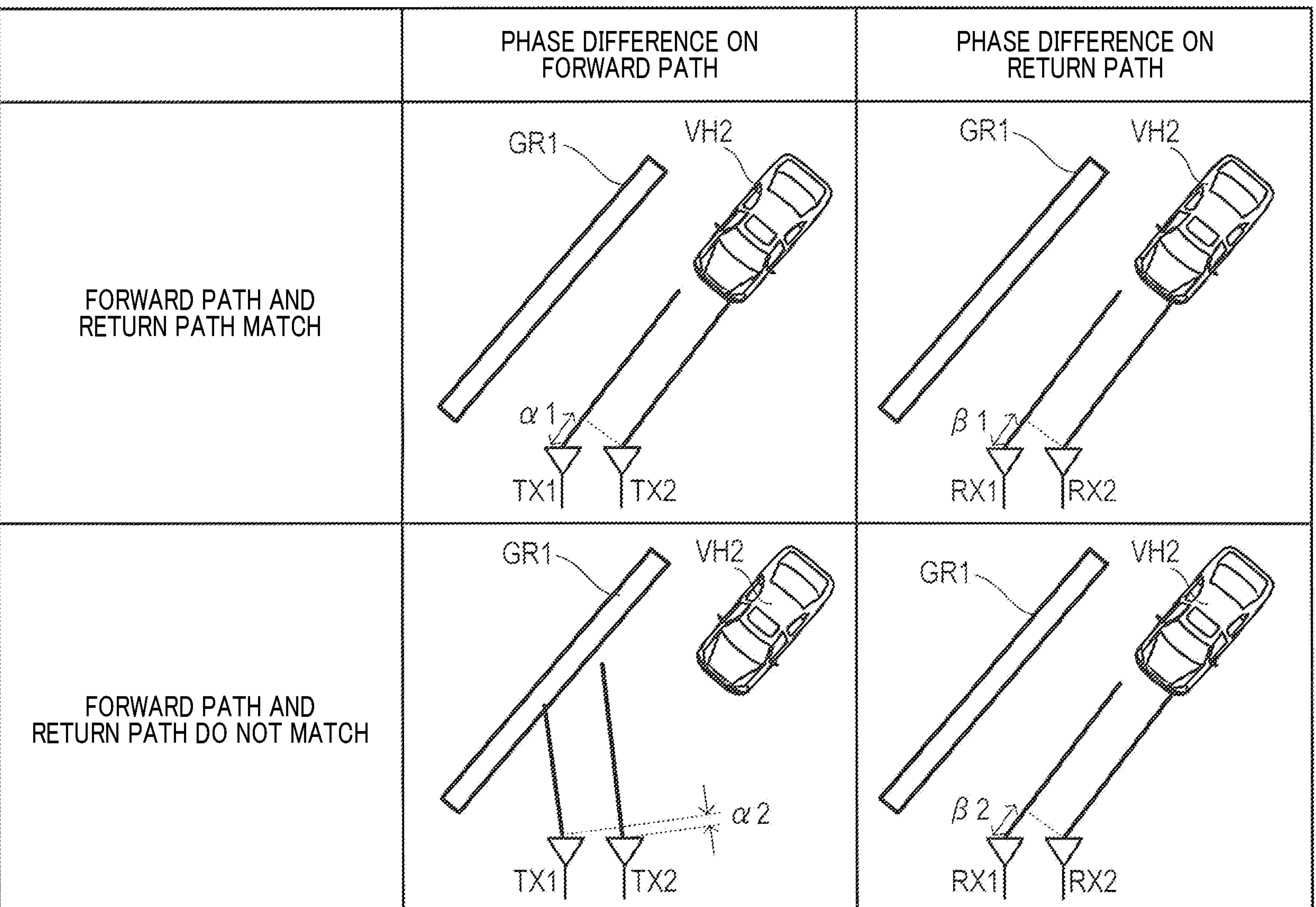
FIG. 17 is a diagram of phase differences of a forward path and a return path.

As shown in FIG. 17, when the forward path and the return path match, a phase difference $\alpha 1$ between the transmission antenna TX1 and the transmission antenna TX2 (that is, a phase difference $\alpha 1$ of the forward path) and a phase difference $\beta 1$ between the reception antenna RX1 and the reception antenna RX2 (that is, a phase difference $\beta 1$ of the return path) match.

Meanwhile, when the forward path and the return path do not match, a phase difference $\alpha 2$ between the transmission antenna TX1 and the transmission antenna TX2 (that is, a phase difference $\alpha 2$ of the forward path) and a phase difference (32 between the reception antenna RX1 and the reception antenna RX2 (that is, a phase difference (32 of the return path) do not match.

Therefore, through a comparison of the transmission phase difference and the reception phase difference, whether an object is an object that directly reflects the transmitted radar wave (that is, a target) or an object that does not directly reflect the transmitted radar wave (that is, a ghost) can be determined.

Here, when a distance Rg1 between the vehicle VH2 and the guardrail GR1 is long (such as when the distance Rg1 is about 10 m), the set of the target distance r and the target velocity v that is obtained for the path of the straight line PR1, and the set of the target distance r and the target velocity v that is obtained for the path of the polygonal line PR2 differ. Therefore, the target and the ghost can be separated. For example, a generated ghost may be farther and may have a lower velocity than the target.

Meanwhile, when the distance Rg1 is short (such as when the distance Rg1 is about 50 cm), the set of the target distance r and the target velocity v that is obtained for the path of the straight line PR1, and the set of the target distance r and the target velocity v that is obtained for the path of the polygonal line PR2 match. Therefore, the target and the ghost cannot be separated. For example, the generated ghost may be at the same distance and may have the same velocity as the target.

Hereafter, the set of the target distance r and the target velocity v that is obtained for the path of the straight line PR1, and the set of the target distance r and the target velocity v that is obtained for the path of the polygonal line PR2 matching is referred to as "RV match." The set of the target distance r and the target velocity v that is obtained for the path of the straight line PR1, and the set of the target distance r and the target velocity v that is obtained for the path of the polygonal line PR2 differing is referred to as "RV mismatch."

Figure 18:
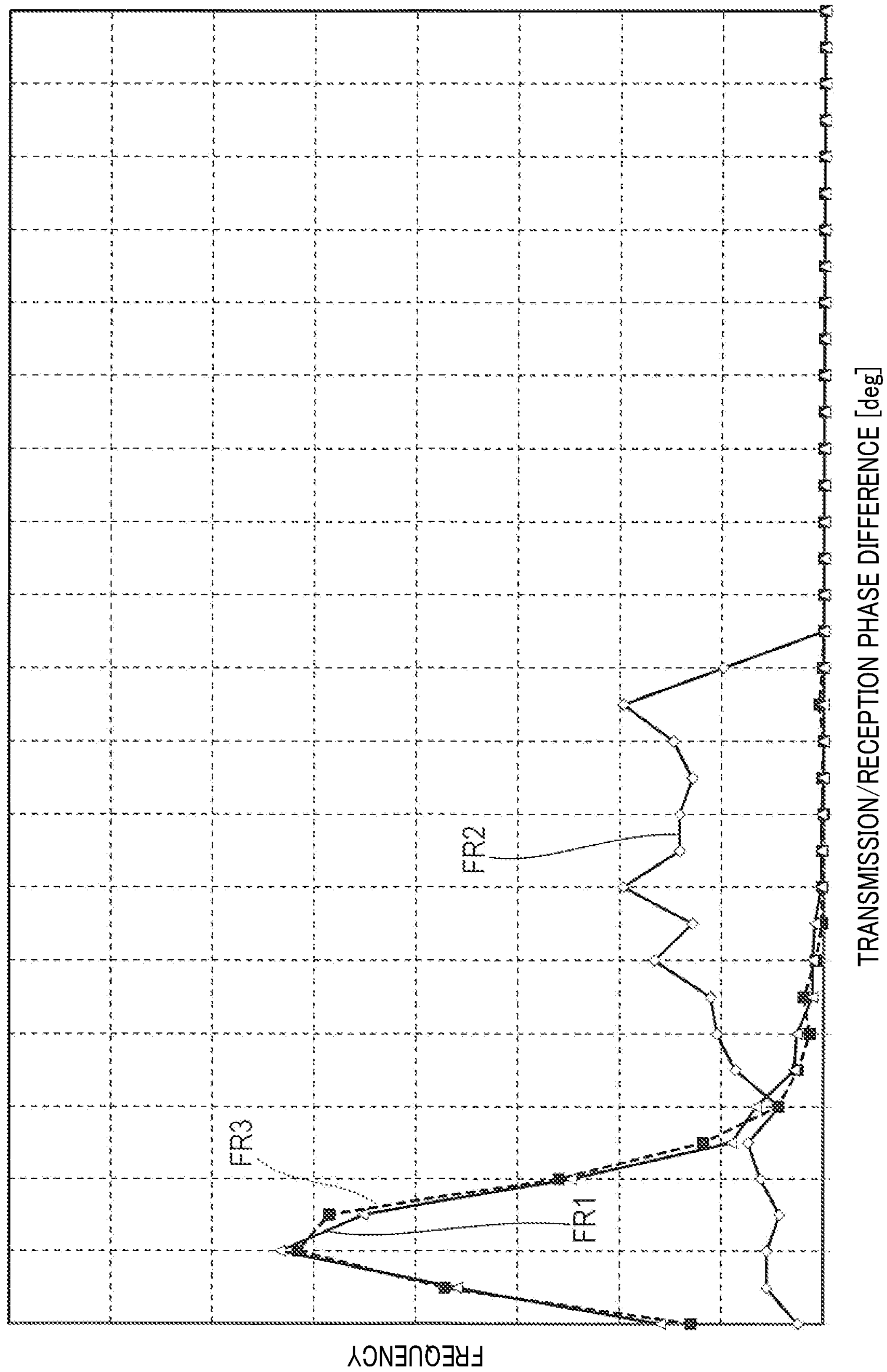
FIG. 18 is a graph of a relationship between transmission-reception phase difference and frequency.

FIG. 18 is a graph that shows a relationship with the transmission-reception phase difference regarding each of a frequency by which the target is detected in "RV mismatch," a frequency by which a ghost is detected in "RV mismatch," and a frequency by which the target and the ghost are detected in "RV match."

A polygonal line FR1 indicates the frequency by which the target is detected in "RV mismatch." A polygonal line FR2 indicates the frequency by which the ghost is detected in "RV mismatch." A polygonal line FR3 indicates the frequency by which the target and the ghost are detected in "RV match."

As shown in FIG. 18, when the transmission-reception phase difference is small, the frequency by which the target is detected in "RV mismatch" is high as indicated by the polygonal line FR1, and the frequency by which the target and the ghost are detected in "RV match" is high as indicated by the polygonal line FR3. In addition, the polygonal line FR1 and the polygonal line FR2 substantially match each other. Therefore, a case in which the target is detected in "RV mismatch" and a case in which the target and the ghost are detected in "RV match" cannot be distinguished by the transmission-reception phase difference.

Meanwhile, when the transmission-reception phase difference is large, the frequency by which the ghost is detected in "RV mismatch" is high as indicated by the polygonal line FR2. Therefore, a case in which the ghost is detected in "RV mismatch" and a case in which the target and the ghost are detected in "RV match" can be distinguished by the transmission-reception phase difference.

As a result of the foregoing, the radar apparatus 1 compares the phase difference of the forward path and the phase difference of the return path, and determines that the forward path and the return path do not match and the object is a ghost when the difference between the phase differences is large, and determines that the forward path and the return path match and the object is a target when the difference between the phase differences is small.

Figure 19:
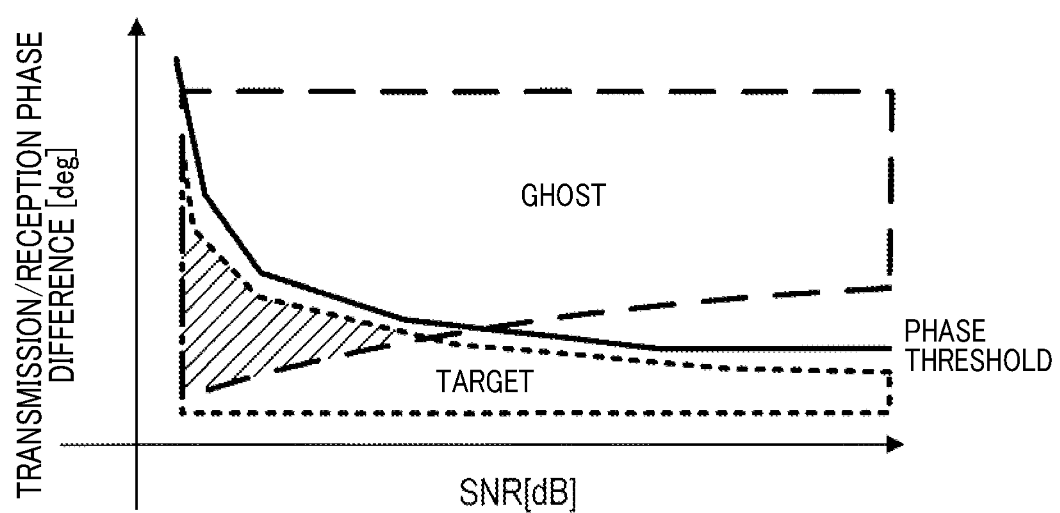
FIG. 19 is a diagram of a determination method for a target and a ghost based on the transmission-reception phase difference and SNR.

As shown in FIG. 19, as a general tendency, the detection result is the target when the transmission-reception phase difference is small, and the detection result is the ghost when the transmission-reception phase difference is large. However, as the SNR decreases, an upper limit value of the transmission-reception phase difference when the detection result is the target increases. Here, the phase threshold is set to be slightly greater than the upper limit value of the transmission-reception phase difference when the detection result is the target.

Meanwhile, as the SNR decreases, a lower limit value of the transmission-reception phase difference when the detection result is the ghost decreases. As a result, as indicated by a hatched region in FIG. 19, when the SNR is small, the target and the ghost cannot be separated with certainty by the transmission-reception phase difference.

Figure 20:
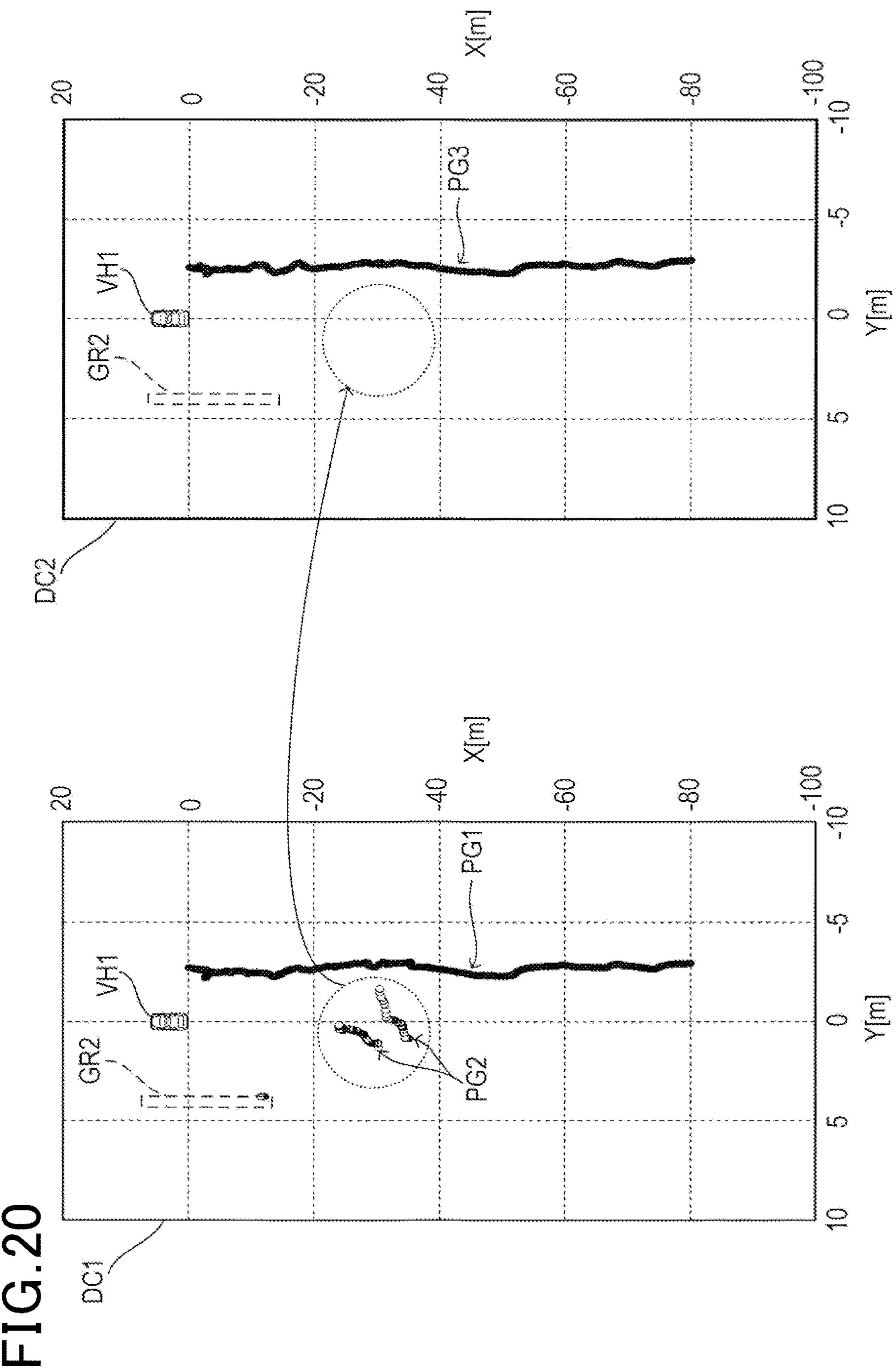
FIG. 20 is distribution diagrams of results of detection of a position of another vehicle by the radar apparatus.

FIG. 20 is distribution diagrams of results of detection of a position of another vehicle by the radar apparatus 1, when the other vehicle that is present in the adjacent traffic lane on the right side of the vehicle VH1 in which the radar apparatus 1 is mounted approaches from the rear right side of the vehicle VH1. Here, a guardrail GR2 is present in a position that is about 4 m away from the vehicle VH1 on a left side of the vehicle VH1.

A distribution diagram DC1 shows the detection results when the ghost determination process to determine whether an object is a target or a ghost based on the transmission-reception phase difference is not performed. A distribution chart DC2 shows the detection results when the ghost determination process is performed. A horizontal axis of the distribution charts DC1 and DC2 indicates a position in a lateral direction with the vehicle VH1 as a point of origin, and a vertical axis indicates a position in a vertical direction with the vehicle VH1 as the point of origin.

In the distribution chart DC1, a point group PG1 that is arrayed in a linear shape is a trajectory of a target and a point group PG2 within a broken-line circle is a trajectory of a ghost.

In the distribution chart DC2, a point group PG2 that is arrayed in a linear shape is a trajectory of a target. However, in the distribution chart DC2, as indicated by a broken-line circle, the trajectory of the ghost detected in the distribution chart DC1 is not present.

The radar apparatus 1 that is configured in this manner includes the transmission antenna unit 2, the reception antenna unit 4, and the processing unit 6.

The transmission antenna unit 3 and the reception antenna unit 4 include a plurality of transmission antennas that are arranged in a row along a predetermined array direction and a plurality of reception antennas that are arranged along a direction that is the same as the array direction of the transmission antennas. In addition, a virtual array in which a plurality of virtual reception antennas are arranged in a row along the array direction is formed by the plurality of transmission antennas and the plurality of reception antennas.

The processing unit 6 detects an object that reflects the transmission signals that are transmitted from the plurality of transmission antennas based on the plurality of virtual reception signals that are received by the plurality of virtual reception antennas.

The processing unit 6 calculates the average transmission phase difference between the plurality of transmission antennas of the transmission signals that are transmitted from the plurality of transmission antennas based on the plurality of virtual reception signals.

The processing unit 6 calculates the average reception phase difference between the plurality of reception antennas of the reception signals that are received by the plurality of reception antennas based on the plurality of virtual reception signals.

The processing unit calculates the transmission-reception phase difference that is the difference between the calculated average transmission phase difference and the calculated average reception phase difference.

The processing unit 6 determines that a detected object is a ghost when the calculated transmission-reception phase difference is greater than the predetermined phase threshold.

In this manner, the radar apparatus 1 can determine whether a detected object is a ghost. Therefore, object detection accuracy can be improved.

In addition, the processing unit 6 sets the phase threshold based on the SNR. As a result, the radar apparatus 1 can suppress occurrence of a situation in which the detected object is determined to be a ghost regardless of the object being a target or the detected object is determined to be a target regardless of the object being a ghost. Object detection accuracy can be further improved.

According to the embodiment described above, the transmission antenna unit 3 and the reception antenna unit 4 correspond to a transmission-reception antenna unit. S10 to S90 correspond to processes as an object detecting unit. S460 corresponds to a process as a transmission phase difference calculating unit.

In addition, S470 corresponds to a process as a reception phase difference calculating unit. S480 corresponds to a process as a transmission-reception phase difference. S490 and S500 correspond to processes as a phase ghost determining unit.

Furthermore, the average transmission phase difference corresponds to a transmission phase difference. The average reception phase difference corresponds to a reception phase difference. S450 corresponds to a process as a phase threshold setting unit. SNR corresponds to a signal strength parameter.

Second Embodiment

A second embodiment of the present disclosure will be described below with reference to the drawings. Here, according to the second embodiment, sections that differ from those according to the first embodiment will be described. Common configurations are given the same reference numbers.

The radar apparatus 1 according to the second embodiment differs from that according to the first embodiment in that the ghost determination process is modified.

Next, steps in the ghost determination process according to the second embodiment will be described.

When the ghost determination process is performed, as shown in FIG. 12, first, at S610, the processing unit 6 performs the orientation estimation calculation and calculates the orientation θ at which the object is present, in a manner similar to that at S410.

Then, at S620, the processing unit 6 calculates the orientation power average value in a manner similar to that at S420.

Furthermore, at S630, the processing unit 6 calculates a residual power average value. Specifically, first, the processing unit 6 calculates electric power (hereafter, residual power) of the virtual reception signal other than the virtual reception signal from the orientation θ calculated at S610, among the virtual reception signals, for each of the (M×N) virtual reception antennas. Then, the processing unit 6 sets the average value of the calculated (M×N) residual powers as the residual power average value.

Next, at S640, the processing unit 6 calculates the noise power average value in a manner similar to that at S430.

Furthermore, at S650, the processing unit 6 calculates the SNR in a manner similar to that at S440. Specifically, the processing unit 6 sets the subtraction value that is obtained by subtracting the noise power average value calculated at S640 from the orientation power average value calculated at S620 as the SNR.

Figure 22:
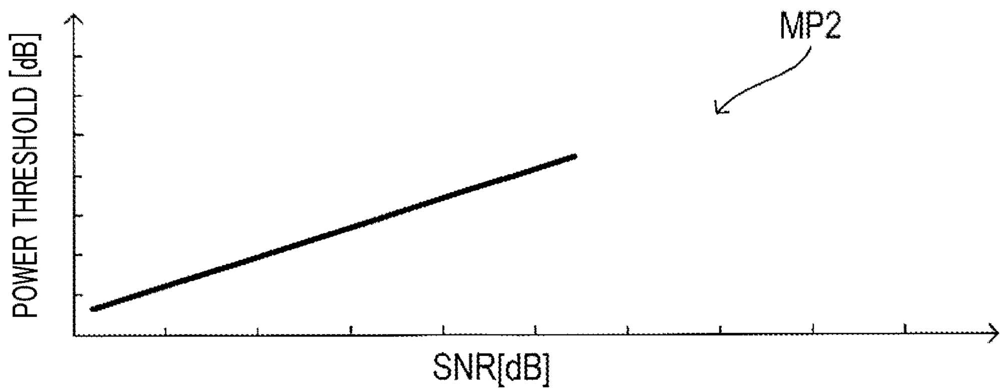
FIG. 22 is a diagram illustrating a configuration of a power threshold map.

Then, at S660, the processing unit 6 calculates a power threshold. Specifically, the processing unit 6 calculates the power threshold from the SNR calculated at S650 by referencing a power threshold map MP2 that indicates a corresponding relationship between the SNR and the power threshold. As shown in FIG. 22, the power threshold map MP2 is set such that a positive correlation is present between the SNR and the power threshold. Here, "a positive correlation is present between the SNR and the power threshold" includes the power threshold continuously increasing in accompaniment with increase in the SNR, in addition to the power threshold increasing in steps in accompaniment with increase in the SNR.

Figure 21:
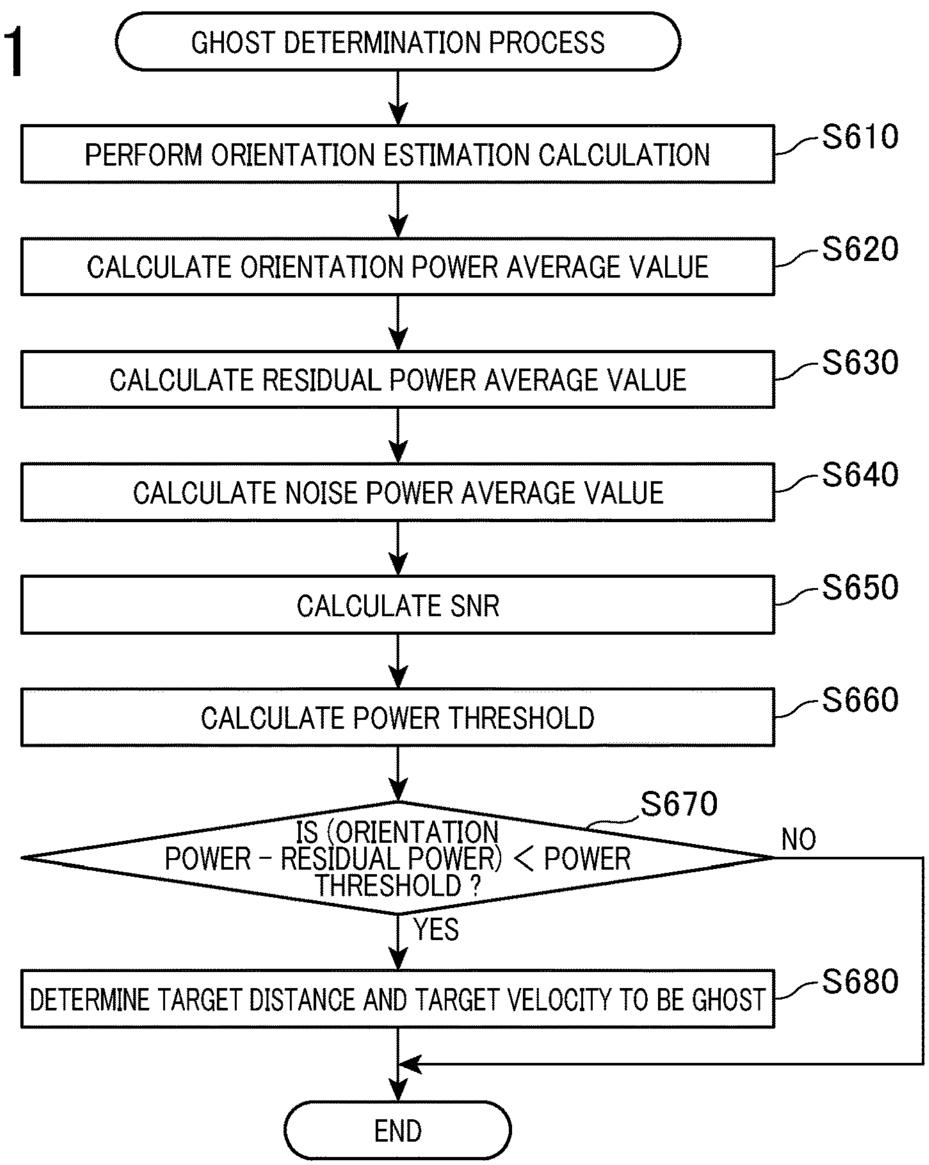
FIG. 21 is a flowchart illustrating a ghost determination process according to a second embodiment.

Upon completion of the process at S660, as shown in FIG. 21, at S670, the processing unit 6 determines whether a subtraction value that is obtained by subtracting the residual power average value calculated at S630 from the orientation power average value calculated at S620 (hereafter, (orientation power−residual power)) is less than the power threshold calculated at S660. Here, when (orientation power−residual power) is equal to or greater than the power threshold, the processing unit 6 ends the ghost determination process. Meanwhile, when (orientation power−residual power) is less than the power threshold, at S680, the processing unit 6 determines that the set of the target distance r and the target velocity v is a ghost and ends the ghost determination process.

Next, a reason why whether an object is a ghost can be determined based on (orientation power−residual power) will be described.

Figure 23:
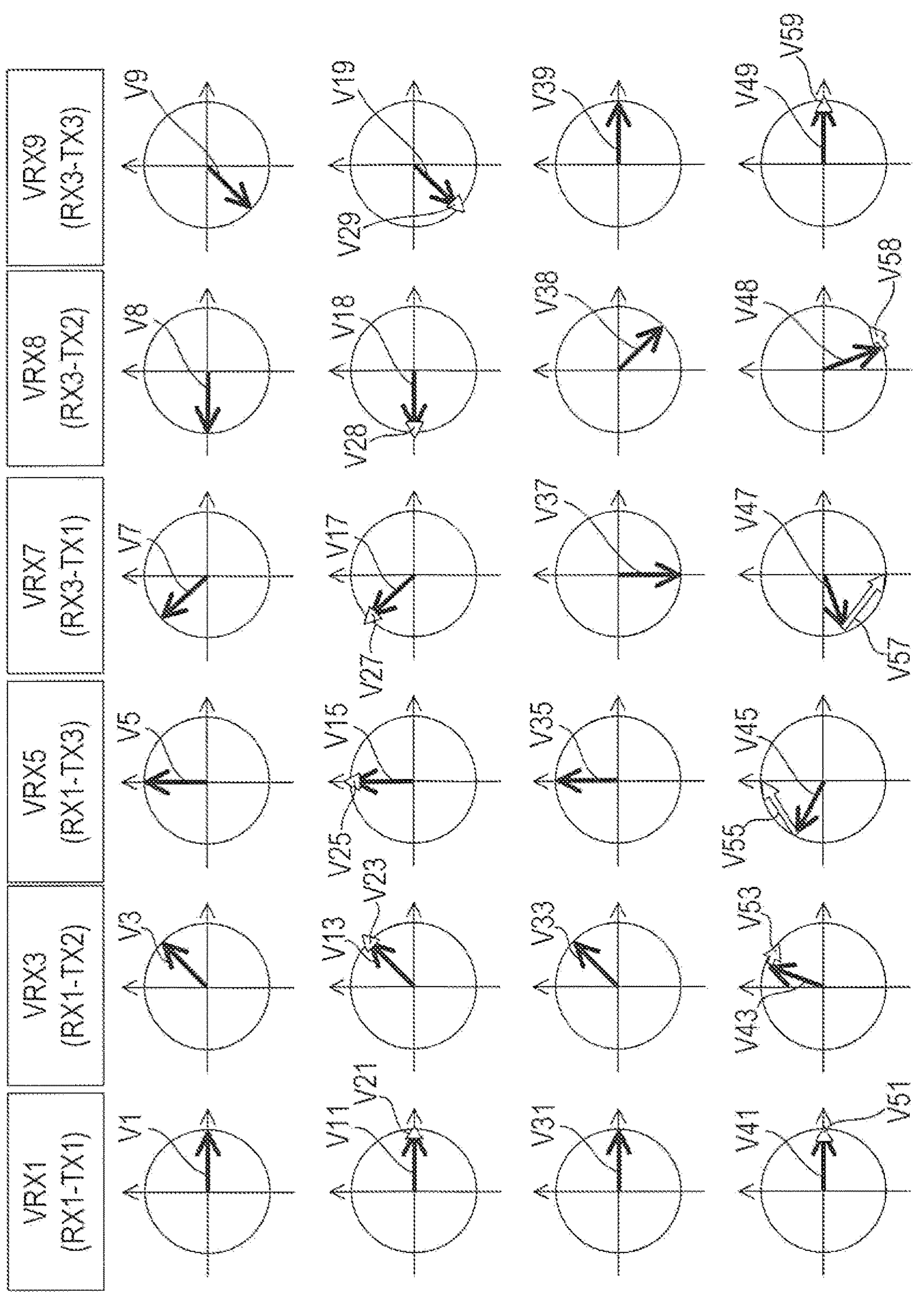
FIG. 23 is a diagram illustrating amplitudes and phases of reception signals and estimated reception signals, shown by vectors.

FIG. 23 is a diagram of amplitudes and phases of the virtual reception signals and estimated reception signals of the virtual reception antennas VRX1, VRX3, VRX5, VRX7, VRX8, and VRX9, shown by vectors. Here, the estimated reception signal expresses a virtual reception signal by a sum of a mode vector and a residual vector. The mode vector is a vector that expresses an ideal reception signal. The residual vector is a vector that expresses noise and the like.

As shown in FIG. 23, vectors V1, V3, V5, V7, V8, and V9 respectively indicate the amplitudes and the phases of the virtual reception signals received by the virtual reception antennas VRX1, VRX3, VRX5, VRX7, VRX8, and VRX9 when the forward path and the return path match.

Vectors V11, V13, V15, V17, V18, and V19 are the mode vectors of the virtual reception antennas VRX1, VRX3, VRX5, VRX7, VRX8, and VRX9 when the forward path and the return path match.

Vectors V21, V23, V25, V27, V28, and V29 are the residual vectors of the virtual reception antennas VRX1, VRX3, VRX5, VRX7, VRX8, and VRX9 when the forward path and the return path match.

Vectors V31, V33, V35, V37, V38, and V39 respectively indicate the amplitudes and the phases of the virtual reception signals received by the virtual reception antennas VRX1, VRX3, VRX5, VRX7, VRX8, and VRX9 when the forward path and the return path do not match.

Vectors V41, V43, V45, V47, V48, and V49 are the mode vectors of the virtual reception antennas VRX1, VRX3, VRX5, VRX7, VRX8, and VRX9 when the forward path and the return path do not match.

Vectors V51, V53, V55, V57, V58, and V59 are the residual vectors of the virtual reception antennas VRX1, VRX3, VRX5, VRX7, VRX8, and VRX9 when the forward path and the return path do not match.

As indicated by the vectors V1, V3, V5, V7, V8, and V9, when the forward path and the return path match, for example, the phases of the virtual reception signals may increase by 45° each in order of virtual reception antennas VRX1, VRX3, VRX5, VRX7, VRX8, and VRX9.

As indicated by the vectors V11, V13, V15, V17, V18, and V19, when the forward path and the return path match, for example, the phases of the mode vectors may increase by 45° each in order of virtual reception antennas VRX1, VRX3, VRX5, VRX7, VRX8, and VRX9.

As indicated by the vectors V21, V23, V25, V27, V28, and V29, when the forward path and the return path match, for example, the phases of the residual vectors may increase by 45° each in order of virtual reception antennas VRX1, VRX3, VRX5, VRX7, VRX8, and VRX9.

In addition, as indicated by the vectors V11, V13, V15, V17, V18, and V19 and the vectors V21, V23, V25, V27, V28, and V29, the amplitude of the mode vector is greater than the amplitude of the residual vector.

Furthermore, the amplitude of the mode vector corresponds to the orientation power and the amplitude of the residual vector corresponds to the residual power. Therefore, when the forward path and the return path match, the orientation power is greater than the residual power.

Meanwhile, as indicated by the vectors V31, V33, V35, V37, V38, and V39, when the forward path and the return path do not match, for example, the phases of the virtual reception signals may increase by 45° each in order of the virtual reception antennas VRX1, VRX3, and VRX5. The phases change 180° between the virtual reception antenna VRX5 and the virtual reception antenna VRX7. In addition, the phases of the virtual reception signals increase by 45° each in order of the virtual reception antennas VRX7, VRX8, and VRX9.

As indicated by the vectors V41, V43, V45, V47, V48, and V49, when the forward path and the return path do not match, for example, the phases of the mode vectors may increase by 72° each in order of the virtual reception antennas VRX1, VRX3, VRX5, VRX7, VRX8, and VRX9. The phases of the mode vectors increase by 72° each because the mode vectors are calculated under a presumption that the angle linearly changes in the orientation estimation calculation.

When the forward path and the return path do not match, the vectors V51, V53, V55, V57, V58, and V59 respectively change such that sums with vectors V41, V43, V45, V47, V48, and V49 match the vectors V31, V33, V35, V37, V38, and V39. Therefore, when the forward path and the return path do not match, the orientation power tends to be equal to or less than the residual power.

In this manner, the tendency of the difference between the orientation power and the residual power differs depending on whether the forward path and the return path match. Therefore, whether an object is a ghost can be determined based on (orientation power−residual power).

Figure 24:
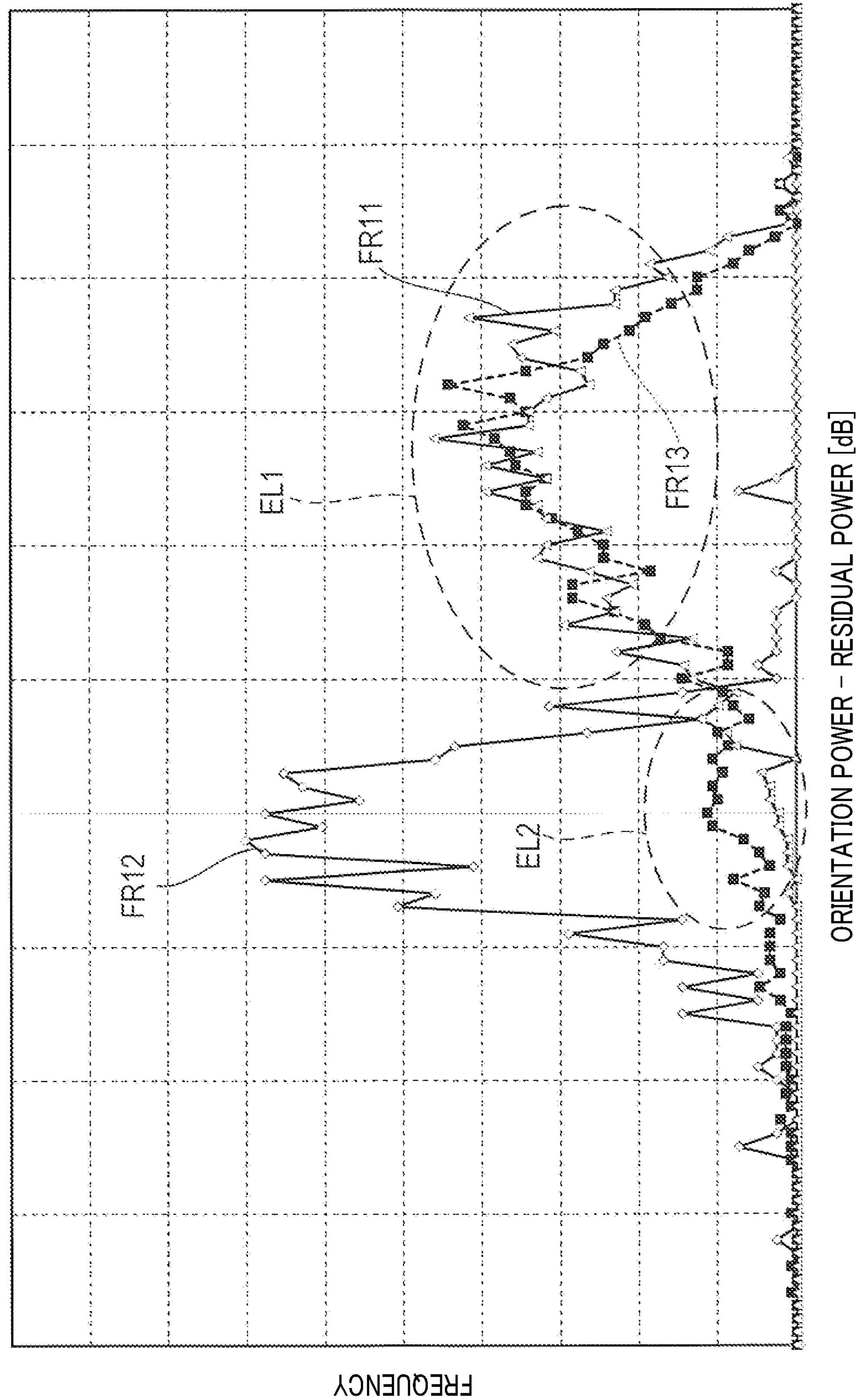
FIG. 24 is a graph illustrating a relationship between (orientation power−residual power) and frequency.

FIG. 24 is a graph that shows a relationship between (orientation power−residual power) and each of the frequency by which the target is detected in "RV mismatch," the frequency by which the ghost is detected in "RV mismatch," and the frequency by which the target and the ghost are detected in "RV match."

A polygonal line FR11 indicates the frequency by which the target is detected in "RV mismatch." A polygonal line FR12 indicates the frequency by which the ghost is detected in "RV mismatch." A polygonal line FR13 indicates the frequency by which the target and the ghost are detected in "RV match."

As shown in FIG. 24, when (orientation power−residual power) is small, the frequency by which the target is detected in "RV mismatch" is low as indicated by the polygonal line FR11, and the frequency by which the ghost is detected in "RV mismatch" is high as indicated by the polygonal line FR12. Therefore, a case in which the target is detected in "RV mismatch" and a case in which the ghost is detected in "RV mismatch" can be distinguished by (orientation power−residual power).

Furthermore, whereas the polygonal line FR11 within an ellipse EL1 and the polygonal line FR13 within the ellipse EL1 substantially match, the polygonal line FR11 within an ellipse EL2 and the polygonal line FR13 within the ellipse EL2 do not match. Therefore, even if the target and the ghost are detected "RV match", the target and the ghost can be distinguished by (orientation power−residual power). Whereas information before the orientation estimation calculation is used in the case of the transmission-reception phase difference, information after the orientation estimation calculation is used in the case of (orientation power−residual power.) Therefore, it is thought that the target and the ghost can be distinguished by (orientation power−residual power).

As a result of the foregoing, when the orientation power is equal to or less than (residual power+offset value), the radar apparatus 1 determines that the forward path and the return path do not match and the object is a ghost. When the orientation power is greater than (residual power+offset value), the radar apparatus 1 determines that the forward path and the return path match and the object is a target.

Figure 25:
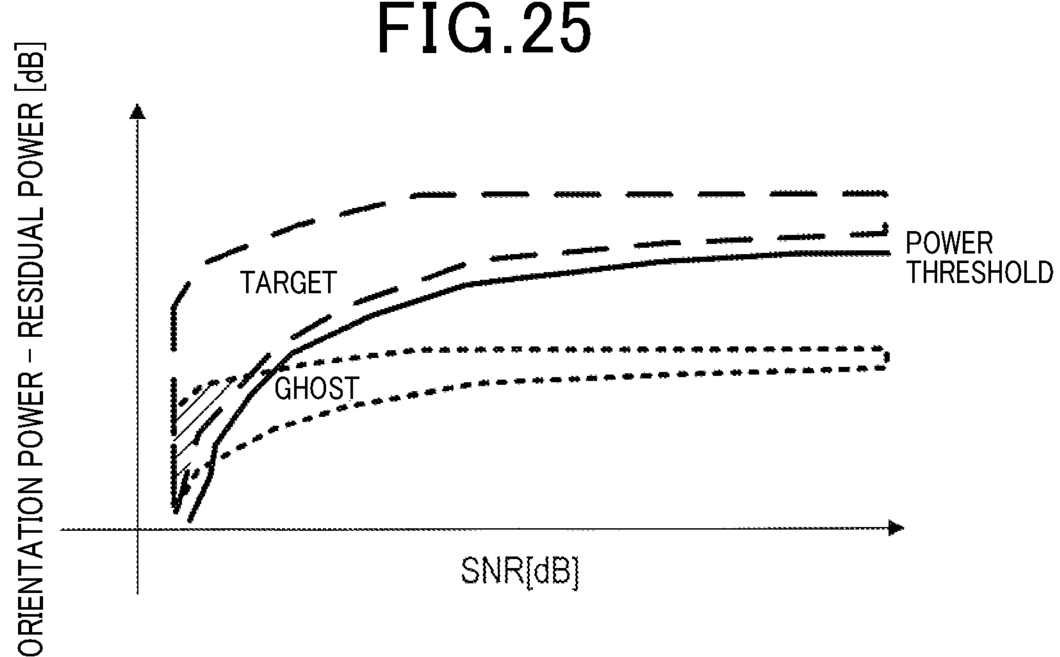
FIG. 25 is a diagram illustrating a determination method for a target and a ghost based on (orientation power−residual power) and SNR.

As shown in FIG. 25, as a general tendency, the detection result is the ghost when (orientation power–residual power) is small and the detection result is the target when (orientation power–residual power) is large. However, as the SNR decreases, a lower limit value of (orientation power–residual power) when the detection result is the target decreases. As a result, as indicated by a hatched region in FIG. 25, when the SNR is small, the target and the ghost cannot be separated with certainty by (orientation power–residual power). Here, the power threshold is set to be slightly less than the lower limit value of (orientation power–residual power) when the detection result is the target.

The radar apparatus 1 that is configured in this manner includes the transmission antenna unit 3, the reception antenna unit 4, and the processing unit 6.

The processing unit 6 calculates the orientation power average value that indicates the electric power of the signals that are received from the orientation θ of the detected object, among the plurality of virtual reception signals.

The processing unit 6 calculates the residual power average value that indicates the electric power of the signals other than the signals that are received from the orientation θ, among the plurality of virtual reception signals.

The processing unit 6 determines that the detected object is a ghost when (orientation power–residual power) that is obtained by subtracting the calculated residual power average value from the calculated orientation power average value is less than the predetermined power threshold.

In this manner, the radar apparatus 1 can determine whether a detected object is a ghost. Therefore, object detection accuracy can be improved.

In addition, the processing unit 6 sets the power threshold based on the SNR. As a result, the radar apparatus 1 can suppress occurrence of a situation in which the detected object is determined to be a ghost regardless of the object being a target or the detected object is determined to be a target regardless of the object being a ghost. Object detection accuracy can be further improved.

According to the embodiment described above, S620 corresponds to a process as an orientation power calculating unit. S630 corresponds to a process as a residual power calculating unit. S670 and S680 correspond to processes as a power ghost determining unit. S660 corresponds to a process as a power threshold setting unit.

In addition, the orientation power average value corresponds to orientation power. The residual power average value corresponds to residual power. (Orientation power–residual power) corresponds to a power subtraction value.

An embodiment of the present disclosure is described above. However, the present disclosure is not limited to the above-described embodiment. Various modifications are possible.

[First Modification]

For example, according to the above-described embodiment, an aspect in which the phase threshold and the power threshold are set based on the SNR is described. However, the phase threshold and the power threshold may be set based on a distance between the radar apparatus 1 and the object. This is because, as shown in expression (7), electric power $P_r$ of the reception signal is inversely proportional to the fourth power of a distance R between the radar apparatus 1 and the object, and a negative correlation is present between the electric power $P_r$ of the reception signal and the distance R. Here, in expression (7), $P_t$ is peak power of the radar apparatus 1, G is antenna gain, λ is a wavelength of a radar wave, and σ is a radar reflection cross-sectional area. $P_t$, G, λ, and σ are known information.

$$P_r = \frac{P_t G^2 \lambda^2 \sigma}{(4\pi)^3 R^4} \quad (7)$$

Therefore, when the distance R is used instead of the SNR, the phase threshold map MP1 is set such that a positive correlation is present between the distance R and the phase threshold. In addition, when the distance R is used instead of the SNR, the power threshold map MP2 is set such that a negative correlation is present between the distance R and the power threshold.

[Second Modification]

According to the above-described embodiment, an aspect in which a subtraction value that is obtained by the residual power average value being subtracted from the orientation power average value is set as (orientation power–residual power) is described. However, a subtraction value that is obtained by a maximum value of the residual power being subtracted from a maximum value of the orientation power may be set as (orientation power–residual power).

The processing unit 6 and the method thereof described in the present disclosure may be actualized by a dedicated computer that is provided so as to be configured by a processor and a memory, the processor being programmed to provide one or a plurality of functions that are realized by a computer program. Alternatively, the processing unit 6 and the method thereof described in the present disclosure may be actualized by a dedicated computer that is provided by a processor being configured by a single dedicated hardware logic circuit or more. Still alternatively, the processing unit 6 and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer. A method for actualizing functions of sections that are included in the processing unit 6 is not necessarily required to include software. All of the functions may be actualized using a single or a plurality of pieces of hardware.

A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiment may be omitted. Moreover, at least a part of a configuration according to an above-described embodiment may be added to or replace a configuration according to another of the above-described embodiments.

The present disclosure can also be actualized by various modes in addition to the above-described radar apparatus 1, such as a system in which the radar apparatus 1 is a constituent element, a program for enabling a computer to function as the radar apparatus 1, a non-transitory computer-readable storage medium such as a semiconductor memory that records the program therein, and an object detection method.

What is claimed is:

1. A radar apparatus comprising:

a transmission-reception antenna unit that includes a plurality of transmission antennas along a predetermined array direction, and a plurality of reception antennas along the array direction, the plurality of transmission antennas and the plurality of reception antennas forming a virtual array in which a plurality of virtual reception antennas are arranged along the array direction;

an object detecting unit that is configured to detect an object that reflects transmission signals that are transmitted from the plurality of transmission antennas, based on a plurality of virtual reception signals that are received by the plurality of virtual reception antennas;

a transmission phase difference calculating unit that is configured to calculate a transmission phase difference between the plurality of transmission antennas of the transmission signals that are transmitted from the plurality of transmission antennas, based on the plurality of virtual reception signals;

a reception phase difference calculating unit that is configured to calculate a reception phase difference between the plurality of reception antennas of reception signals that are received by the plurality of reception antennas, based on the plurality of virtual reception signals;

a transmission-reception phase difference calculating unit that is configured to calculate a transmission-reception phase difference that is a difference between the transmission phase difference that is calculated by the transmission phase difference calculating unit and the reception phase difference that is calculated by the reception phase difference calculating unit; and a phase ghost determining unit that is configured to determine that the object that is detected by the object detecting unit is a ghost, in response to the transmission-reception phase difference that is calculated by the transmission-reception phase difference calculating unit being greater than a predetermined phase threshold.

2. The radar apparatus according to claim 1, comprising:

a phase threshold setting unit that is configured to set the phase threshold based on a signal strength parameter that indicates strength of the plurality of virtual reception signals.

3. The radar apparatus according to claim 2, wherein:

the signal strength parameter is a signal-to-noise ratio.

4. The radar apparatus according to claim 2, wherein:

the signal strength parameter is a distance between the radar apparatus and the object.

5. A radar apparatus comprising:

a transmission-reception antenna unit that includes a plurality of transmission antennas along a predetermined array direction, and a plurality of reception antennas along the array direction, the plurality of transmission antennas and the plurality of reception antennas forming a virtual array in which a plurality of virtual reception antennas are arranged along the array direction;

an object detecting unit that is configured to detect an object that reflects transmission signals that are transmitted from the plurality of transmission antennas, based on a plurality of virtual reception signals received by the plurality of virtual reception antennas;

an orientation power calculating unit that is configured to calculate orientation power that is electric power of a signal that is received from an orientation of the object that is detected by the object detecting unit, among the plurality of virtual reception signals;

a residual power calculating unit that is configured to calculate residual power that is electric power of a signal other than the signal that is received from the orientation, among the plurality of virtual reception signals; and a power ghost determining unit that is configured to determine that the object that is detected by the object detecting unit is a ghost, in response to a power subtraction value being less than a predetermined power threshold, the power subtraction value being obtained by the residual power that is calculated by the residual power calculating unit being subtracted from the orientation power that is calculated by the orientation power calculating unit.

6. The radar apparatus according to claim 5, comprising:

a power threshold setting unit that is configured to set the power threshold based on a signal strength parameter that indicates strength of the plurality of virtual reception signals.

7. The radar apparatus according to claim 6, wherein:

the signal strength parameter is a signal-to-noise ratio.

8. The radar apparatus according to claim 6, wherein:

the signal strength parameter is a distance between the radar apparatus and the object.

9. An antenna apparatus comprising:

a transmission-reception antenna unit that includes a plurality of transmission antennas along a predetermined array direction, and a plurality of reception antennas along the array direction, the plurality of transmission antennas and the plurality of reception antennas forming a virtual array in which a plurality of virtual reception antennas are arranged along the array direction;

an object detecting unit that is configured to detect an object that reflects transmission signals that are transmitted from the plurality of transmission antennas, based on a plurality of virtual reception signals that are received by the plurality of virtual reception antennas;

a transmission phase difference calculating unit that is configured to calculate a transmission phase difference between the plurality of transmission antennas of the transmission signals that are transmitted from the plurality of transmission antennas, based on the plurality of virtual reception signals;

a reception phase difference calculating unit that is configured to calculate a reception phase difference between the plurality of reception antennas of reception signals that are received by the plurality of reception antennas, based on the plurality of virtual reception signals;

a transmission-reception phase difference calculating unit that is configured to calculate a transmission-reception phase difference that is a difference between the transmission phase difference that is calculated by the transmission phase difference calculating unit and the reception phase difference that is calculated by the reception phase difference calculating unit; and a phase ghost determining unit that is configured to determine that the object that is detected by the object detecting unit is a ghost, in response to the transmission-reception phase difference that is calculated by the transmission-reception phase difference calculating unit being greater than a predetermined phase threshold.

10. The antenna apparatus according to claim 9, comprising:

a phase threshold setting unit that is configured to set the phase threshold based on a signal strength parameter that indicates strength of the plurality of virtual reception signals.

11. The antenna apparatus according to claim 10, wherein: the signal strength parameter is a signal-to-noise ratio.

12. The antenna apparatus according to claim 10, wherein:

the signal strength parameter is a distance between the antenna apparatus and the object.

13. An antenna apparatus comprising:

a transmission-reception antenna unit that includes a plurality of transmission antennas along a predetermined array direction, and a plurality of reception antennas along the array direction, the plurality of transmission antennas and the plurality of reception antennas forming a virtual array in which a plurality of virtual reception antennas are arranged along the array direction;

an object detecting unit that is configured to detect an object that reflects transmission signals that are transmitted from the plurality of transmission antennas, based on a plurality of virtual reception signals received by the plurality of virtual reception antennas;

an orientation power calculating unit that is configured to calculate orientation power that is electric power of a signal that is received from an orientation of the object that is detected by the object detecting unit, among the plurality of virtual reception signals;

a residual power calculating unit that is configured to calculate residual power that is electric power of a signal other than the signal that is received from the orientation, among the plurality of virtual reception signals; and a power ghost determining unit that is configured to determine that the object that is detected by the object detecting unit is a ghost, in response to a power subtraction value being less than a predetermined power threshold, the power subtraction value being obtained by the residual power that is calculated by the residual power calculating unit being subtracted from the orientation power that is calculated by the orientation power calculating unit.

14. The antenna apparatus according to claim 13, comprising:

a power threshold setting unit that is configured to set the power threshold based on a signal strength parameter that indicates strength of the plurality of virtual reception signals.

15. The antenna apparatus according to claim 14, wherein:

the signal strength parameter is a signal-to-noise ratio.

16. The antenna apparatus according to claim 14, wherein:

the signal strength parameter is a distance between the antenna apparatus and the object.

* * * * *